(12) United States Patent
Jaiswal

(10) Patent No.: US 8,250,805 B2
(45) Date of Patent: Aug. 28, 2012

(54) PLANT PRESERVATION SYSTEMS

(75) Inventor: Sudhir K. Jaiswal, Fremont, CA (US)

(73) Assignee: Sudhir K. Jaiswal, Fremont, CA (US)

( * ) Notice: Subject to any disclaimer, the term of this patent is extended or adjusted under 35 U.S.C. 154(b) by 0 days.

(21) Appl. No.: 12/226,694

(22) PCT Filed: Apr. 24, 2007

(86) PCT No.: PCT/US2007/010000
§ 371 (c)(1),
(2), (4) Date: Apr. 13, 2009

(87) PCT Pub. No.: WO2007/127238
PCT Pub. Date: Nov. 8, 2007

(65) Prior Publication Data
US 2009/0227454 A1    Sep. 10, 2009

Related U.S. Application Data

(60) Provisional application No. 60/795,092, filed on Apr. 25, 2006.

(51) Int. Cl.
*A01G 5/06* (2006.01)
(52) U.S. Cl. ............................. 47/41.01; 47/84; 47/72
(58) Field of Classification Search ....... 47/84, 58.1 CF, 47/72, 41.01–41.15; 206/423
See application file for complete search history.

(56) References Cited

U.S. PATENT DOCUMENTS

| | | | | |
|---|---|---|---|---|
| 1,988,886 A | * | 1/1935 | Wilson | 47/84 |
| 2,994,424 A | * | 8/1961 | Selby et al. | 206/423 |
| 4,006,561 A | * | 2/1977 | Thoma et al. | 47/84 |
| 4,091,925 A | | 5/1978 | Griffo et al. | |
| 4,189,868 A | * | 2/1980 | Tymchuck et al. | 47/84 |
| 4,515,266 A | | 5/1985 | Myers | |
| 4,801,014 A | * | 1/1989 | Meadows | 206/423 |
| 4,811,841 A | * | 3/1989 | Domenichiello | 206/423 |
| 5,379,549 A | * | 1/1995 | Carcich et al. | 47/84 |
| 5,536,155 A | | 7/1996 | Futaki et al. | |
| 5,564,225 A | | 10/1996 | Quiding et al. | |
| 5,961,886 A | * | 10/1999 | Hashimoto et al. | 252/400.3 |
| 6,272,792 B1 | * | 8/2001 | Van den Kieboom | 47/84 |
| 2004/0244285 A1 | * | 12/2004 | Fishman et al. | 47/41.11 |

FOREIGN PATENT DOCUMENTS

| | | | |
|---|---|---|---|
| WO | WO 03/075638 | * | 9/2003 |

* cited by examiner

*Primary Examiner* — Rob Swiatek
*Assistant Examiner* — Lisa Tsang
(74) *Attorney, Agent, or Firm* — Gary Baker; Quine Intellectual Property Law Group, P.C.

(57) ABSTRACT

Methods, devices and compositions to preserve plants, such as cut flowers. The methods include, e.g., sealing cut stems in antimicrobial preservative media, sealing the leaves in a substantially unvented compartment and sealing the flower blossoms in a less humid vented environment. Methods include, e.g., sealing cut flower ends in a preservative liquid, sealing the majority of the stem length and leaves in a stem compartment and holding the blossoms and at least a portion of the leaves in a relatively open blossom compartment. The devices include, e.g., packaging materials and preservative to vitalize and protect uprooted plants and/or cut flowers. The compositions of the invention provide, e.g., packaging systems and preservative media which inhibit microbe growth and vitalize cut plants.

14 Claims, 7 Drawing Sheets

PLANT PRESERVATION SYSTEMS

CROSS-REFERENCE TO RELATED APPLICATIONS

This application is a U.S. National phase Application filed under 35 U.S.C. §371, and claims benefit of and priority from, Patent Cooperation Treaty application PCT/US2007/010000, "Plant Preservation Systems", by Sudhir K. Jaiswal, with an international filing date of Apr. 24, 2007; which claims priority to and benefit of a prior U.S. Provisional Application No. 60/795,092, "Plant Preservation Systems", by Sudhir K. Jaiswal, filed Apr. 25, 2006. The full disclosure of the prior application is incorporated herein by reference.

FIELD OF THE INVENTION

This invention is in the field of methods, devices and compositions to preserve plants. The present invention relates to, e.g., methods to preserve the freshness of cut or rooted flowers by compartmentalization of the cut ends or roots, stems/leaves, and/or blossoms. The plant preservation devices of the invention include, e.g., packaging systems providing spill-free retention of preservative media, a vented leaf compartment, a sealed blossom compartment. The entire compartmental system can optionally be enclosed in and an outer shipping container and/or environmentally controlled cargo container. The roots or cut ends can optionally be in contact with a preservative composition providing, e.g., a thickener, and/or microbe inhibitors.

BACKGROUND OF THE INVENTION

The importance of preserving plants and cut flowers continues to increase as consumers demand a greater selection of plants and flowers from around the world. Consumers have come to expect florists to provide a variety of non-indigenous plants, and out of season flowers, from around the world. Better plant and cut flower preservation can allow longer enjoyment of flowers by customers after jet/ocean transport, regional wholesaling, and retail display by the florist.

One requirement for preservation of most uprooted or cut plants is water. Many flowers and plant parts quickly lose turgidity and wilt without a ready supply of water at the cut stem. It is an ancient practice to increase the attractive life of the flowers by keeping cut stems in water, typically refilling and changing infested water as the flowers degrade. Provision of preservative media with certain salts and sugars in the water, to maintain an appropriate osmotic balance, has been known to forestall wilting of cut flowers. These approaches, though useful, provide only a short respite from wilting and degradation for many types of cut flowers. In addition, the presence of liquids in flower shipments has been forbidden by many airlines, due to the potential damage from spilled solutions on the aircraft and cargo.

Microbes can degrade the appearance of plants and cut flowers in storage and during transport. Systemic attacks by bacteria often originate in stem water and can cause the flowers to wilt early. Fungi can colonize the outside of the plants, making them appear rusty or moldy. A variety of methods have been used to combat microbial destruction of plants and cut flowers, such as the use of sterile technique, refrigeration, application of biocides, and the use of antibiotics.

Microbial load can be reduced through the practice of sterile technique. Sterilized fertilizer can be fed to the plants during the growth period. Plants can be grown in artificial, or sterile soil and harvested without contact by contaminated surfaces. Cut flowers can be packaged in particle controlled environments, such as within HEPA filtered rooms. Such practices can be expensive and may fail due to the large variety of microbes that normally populate plant surfaces, even with these precautions.

The application of biocides, such as ozone, ethanol, or sodium hypochlorite, can kill microbes on the surface of plants. Still, many microbes, such as spore-forming bacteria and fungi, can survive the treatment. Biocide treatments are generally harsh and can harm plant surfaces or the color of flowers.

Antibiotics can be useful in preventing microbial infestation of cut flowers. Antibiotics, and anti-fungals, in stem water can stop microbial contamination of the water. The antibiotics can diffuse systemically to protect the entire cut plant. However, even broad spectrum antibiotics do not stop all microbes. Widespread use of antibiotics can select for resistant microorganisms and should be avoided. Stem water with antibiotics may not be safe should it be consumed by children or pets.

Flower wilting can be caused by exposure to ethylene, a gaseous natural plant hormone that can be generated in the cut flowers. Ethylene levels can be reduced by supplying ventilation. For example, in U.S. Pat. No. 4,515,266 to Meyers, "Modified Atmosphere Package and Process", produce is preserved by venting a storage container with a mixture of inert gasses. Another way to minimize the damage caused by ethylene is by application of anti-ethylene agents, such as, e.g., MCP (methylcyclopropene), which is known to inhibit ethylene production under certain conditions.

Aerobic bacteria and fungi can be inhibited by removing oxygen from the environment. For example, U.S. Pat. No. 5,564,225 to Quiding et al., "Method and Apparatus for Packaging and Preservation of Flowers and Other Botanicals", describes how cut flowers can be preserved by packaging them in a mixture of inert gasses under a partial vacuum. However, the equipment and packaging materials involved can be expensive. In addition, factors other than aerobic microbes can still deteriorate the uprooted plants and cut flowers.

Plants can be stabilized by hermetically sealing them in a container. However, this often creates more problems than it solves, e.g., due to condensation on container walls contaminating the plant and/or build up of metabolic product gasses that can accelerate degradation of the plant.

In view of the above, a need exists for ways to ship plants and store plants in a suspended state. It would be desirable to have a shipping and storage container that preserves moisture without wetting plant surfaces. Benefits can be provided from systems and methods that provide water and preservative components to plants in storage without creating environments conducive to growth of undesirable microbes. The present invention provides these and other features that will be apparent upon review of the following.

SUMMARY OF THE INVENTION

The present invention provides, e.g., compositions, systems, devices and methods to preserve plants, such as cut flowers, e.g., by providing optimum environments for different parts of the plants during shipping and storage. For example, the flower roots or cut stem ends can be inserted into a preservative container positioned at the bottom of the sealable container or formed from the bottom of the sealable container. The flowers can have most of the bottom stem and leaves sealed in a stem compartment to minimize transpiration while allowing adequate transport of nutrients for the flower buds. The flowers can be packaged into a sealable container that includes a perforated stem section and a blossom section that does not allow gas exchange with the exterior environment. The preservative container, a stem compartment, and a blossom compartment can be formed and defined, e.g., by constricting the sealable container at appropriate levels along the container. To provide additional mechanical protection, to separate condensation from the flowers, and/or to provide an environment that suspends metabolism, the flowers packaged in the sealable container can be further enclosed in an outer shipping container.

The present invention includes flower preservation systems configurable to suite various requirements of different flowers and conditions. A flower preservation device can include a sealable container with a stem section and a blossom section. Flowers can be packaged in the sealable container with the stems substantially in the stem section and the blossoms substantially in the blossom section. There can be a constriction in the sealable container between the stem section and blossom section to define a stem compartment and a blossom compartment. In another configuration, the flower preservation device can have a sealable container with three sections: a preservative container section, a stem section, and a blossom section. Flowers having roots or cut stem ends, stems and blossoms are packaged within the sealable container with the roots or cut stem ends substantially within the preservative container section, the stems substantially within the stem section, and the blossoms substantially within the blossom section. A constriction in the sealable container between the stem section and blossom section defines and separates a stem compartment and a blossom compartment; the opening between the preservative container section and the stem section can be sealed around the flower stems, e.g., with rubber bands. In many configurations, the sealable container has gas exchange perforations. For example, a stem section can have gas exchange perforations so that the stem compartment has substantially lower relative humidity than the blossom compartment (e.g., allowing transpiration) or the stem compartment can have substantially greater gas exchange with the environment outside the sealable container than the blossom compartment (e.g., allowing photosynthesis or the release of ethylene gas). In a typical embodiment, the stem compartment is substantially sealed while the blossom compartment is open to the external environment through holes in the sealable container material or an unsealed top opening.

In a preferred embodiment, the flower preservation system of the invention includes a cargo container holding cut flowers in sealable containers. The sealable container can have a constriction defining a stem compartment and the flowers can be packaged with at least a portion of the floral stems and/or leaves (i.e., segment of the stem length or percentage of the total leaves per flower) in the stem compartment and at least a portion of the floral stems and/or leaves outside the stem compartment. The cargo container can be refrigerated, e.g., to a temperature between 0° C. and 10° C.; and have a dehumidifier providing a humidity of less than 80% relative humidity in the cargo container. It is preferred that the walls of the stem compartment have no holes or have less than about 1 $cm^2$ total of hole opening area. It is preferred that the constriction captures not more than about 80 percent of the leaves (preferably, lower leaves) in the stem compartment. Such a system can provide relatively low humidity at the flower blossoms, retain fluids in the stems and provide fresh fluids to the blossoms, thus minimizing degradation of the flowers during long transit in the cargo container.

In another embodiment, the system for preservation of flowers can include a configuration with the blossoms and upper leaves relatively exposed to external air and with the lower stem and lower leaves enclosed within a stem compartment. The flowers' cut stems or roots inserted into a preservative container can be at the bottom of the stem compartment and/or separated from the stem compartment by a constriction of the sealable container. This configuration allows flower buds to stay dry and to receive preservative liquid, while reducing consumption of preservative by the bulk of the leaves. In certain embodiments of the systems, the portion of stem length enclosed (e.g., the average stem length portion for flower stems at least partially enclosed) by the constriction or average proportion of leaves enclosed (e.g., the average portion of leaves on each flower stem at least partially enclosed) ranges from about 40% to about 95%, from about 50% to about 90%, from about 60% to about 85%, from about 65% to about 80%, or about 75%. Alternately, e.g., where the flowers have long leaves that can extend from the stem compartment through the constriction and into the blossom compartment, the portion of leaves can be calculated as the percentage of total leaf area in each compartment. Preferably, the leaves in the stem compartment are those attached to the stem at relatively low points and leaves above the stem compartment, e.g., in the blossom compartment, are those leaves that attach to the stems at relatively high points.

The flower preservation devices of the invention can protect cut flowers or rooted flowers. The flowers can be of any type, e.g., roses, lilies, tulips, alstroemeria, carnations, chrysanthemums and orchids or mixed bouquets. The devices can preserve a single flower, 2 flowers, 5 flowers, 12 flowers, 50 flowers, or more. In many cases, the flowers have unopened blossoms (buds) or partially opened flower blossoms. The flowers typically include stems with leaves. In many embodiments of packaged flowers, the leaves and stems are packaged predominantly in the stem compartment, e.g., at least 50%, at least 60%, at least 75%, at least 80%, at least 90%, at least 95%, at least 98%, or more of the flower stems and/or leaves are contained within the stem compartment of the sealable container.

The sealable container can be any container that can function to enclose the separate flower parts or portions of flower parts in environments of different compartments. In a preferred embodiment, the sealable container comprises a flexible plastic container, preferably with a shape conforming to the shape of the packaged bunch of flowers, e.g., the substantially conical shape of many flowers bouquets. In one aspect, the sealable container has an upper (top) opening large enough to receive the flowers to be packaged, and capable of being substantially sealed or hermetically sealed against migration of gasses. However, in many embodiments of the invention, the top opening of the sealable container is not actually sealed in practice. In other embodiments, although the sealable container is not sealed at the top, constrictions along the sealable container define and substantially seal compartments, such as, e.g., stem compartments and preservative containers. In another aspect of the sealable container, the stem section and/or blossom section, has gas exchange perforations that allow gasses to migrate in and/or out of one or more the sealable container compartments for gas exchange with the external environment. Perforations in a sealable container stem section can provide for a higher gas exchange rate between the stem compartment and the external environment than for a sealed and non-perforated blossom compartment, and/or a lower relative humidity in the stem compartment than in the blossom compartment. Alternately, perforations in a sealable container blossom section can provide for a higher gas exchange rate between the blossom compartment and the external environment than for a sealed and non-perforated stem compartment, and/or a lower relative humidity or higher $CO_2$ levels, in the blossom compartment than in the stem compartment.

Flower preservation systems of the invention can include a preservative container to receive the flower roots and/or stem ends. The preservative container can be, e.g., a cup-like or bag like container in the bottom section of the sealable container and/or can be formed from the bottom of the sealable container, to contain a preservative liquid material. The preservative container can have an opening sealed around the flower stems so that, e.g., the preservative does not substantially escape from the preservative container in normal use. One way to seal the preservative container opening is to wrap a filament around the opening, e.g., constricting the opening (e.g., sealable container wall between the preservative container and the stem section) about the flower stems. In some embodiments, the preservative container can be vented, e.g., to allow carbon dioxide produced by the media to enter selected compartments, such as blossom compartments or a compartment between a sealable container and an outer shipping container.

Filaments can be used in the invention to constrict or seal compartments and containers. The filaments can seal the boundary between compartments, close the sealable opening, and/or seal the top of the preservative container. Filaments can include, e.g., a rubber band, a wire, a string, a ribbon, tape, a cable tie, and/or the like. In an embodiment especially useful in preventing fluids from migrating across the seals, a seal is formed by two or more separate filaments constricting at separate points spaced along the stems.

The preservative container can contain a preservative liquid that helps preserve the freshness of the flowers. The preservative liquid can be, e.g., substantially sugar free to minimize microbial growth. The preservative can be a media that includes media constituents dissolved in water to provide, e.g., appropriate metabolic signals to the flowers and/or to reduce microbial infestation, e.g., hormones like IAA and/or antimicrobial agents. A thickener can be included in the preservative liquid, e.g., to minimize unwanted flow of the preservative liquid in the packaging system. A preferred thickener is an agar. A preferred preservation media includes agar, an auxin, a cytokinin, copper sulfate, citric acid, baking soda and MS salts & vitamins or KM salts & vitamins. In one aspect, the preservative container can include combinations of chemicals that produce carbon dioxide to reduce metabolism or reduce growth of microbes in contiguous compartments.

Preservation devices of the invention can include an outer shipping container that encloses flowers packaged in a sealable container. The shipping container can physically protect the flowers, allow condensation of water in the space between the sealable container and shipping container so the flowers don't get wet, and/or substantially seal gasses within the system. In some embodiment, the shipping container is hermetically sealed around the sealable container of flowers, e.g., to reduce the metabolism of the flowers, retain inert gasses, and reduce growth of certain microbes. In other embodiments, the shipping container is protects the flowers but is open to gas exchange in the upper section, e.g., to reduce the moisture around flowers. The shipping container can be a solid container (e.g., a box) or a flexible container, such as, e.g., a plastic bag or tube. Shipping containers can hold one, two or more sealable containers, each containing one or more packaged flowers. Finally, packaged flowers can be held within the hold of an aircraft, hold of a ship, a truck trailer, a cargo container and/or the like for shipping or storage.

The present invention includes methods for preserving flowers. For example, flowers can be preserved by packaging the flowers in a sealable container, and sealing the sealable container. The sealable container can include a constriction around the stems, thereby defining a stem compartment and a blossom compartment. The stem compartment can preferably have perforated walls. In some cases, the stem compartment walls can be perforated, e.g., by an end user (e.g., retailer) after shipping is complete. A benefit of the perforated walls in some embodiments can be, e.g., that the stem compartment can have significantly more gas exchange with the environment outside the sealable container than the blossom compartment, and/or the stem compartment can have a substantially lower relative humidity than the blossom compartment. In other cases, e.g., depending on the type of flower and transport conditions, gas exchange in the stem compartment can be restricted (to reduce consumption of preservative liquid) and the gas exchange in the blossom section can be enhanced (to avoid conditions promoting Botrytis).

In preferred methods of preserving flowers, the blossoms and top leaves are more open to gas exchange with the external environment or to carbon dioxide treatment. Such an arrangement can allow, e.g., for nutrient fluids to be transported up to the blossoms, while keeping the blossoms dry and minimizing consumption of the preservative liquid. For example, methods of preserving cut flowers, can include inserting cut stem ends of one or more flowers into a preservative container of preservative liquid, inserting the stems of the one or more flowers into a sealable container, and constricting the sealable container at a point along the stems, thus forming a stem compartment with a portion of the leaves are enclosed and a significant portion of leaves and individual stems are not enclosed within the stem compartment. Such constriction can have the benefit of fanning out the blossoms to provide better spacing between buds. In certain embodiments, the portion of stem length enclosed (e.g., the average stem length portion for flower stems at least partially enclosed) or average proportion of leaves enclosed (e.g., the average portion of leaves on each flower stem at least partially enclosed) ranges from about 40% to about 95%, from about 50% to about 90%, from about 60% to about 85%, from about 65% to about 80%, or about 75%.

In a preferred embodiment of the methods, the packaged flowers are placed in a cargo container (such as an ocean going cargo container) for prolonged transit and/or storage. For example, the cut flower stems can be inserted a sealable container, constricting the sealable container at a point along the stems can form a stem compartment, and the packaged flowers can be placed into the cargo container. In this embodiment, it is preferred that a portion of the leaves be enclosed within the stem compartment and at least a portion of the leaves be outside the stem compartment. This ensures, e.g., flow of plant fluids or preservative media to the top of the plant (e.g., flower buds) while minimizing loss of fluids by transpiration from the bulk of the leaves. This structure/function relationship has demonstrated surprising benefits in cut flower preservation. Further benefits can be realized by refrigerating the cargo container and/or by dehumidifying the cargo container. The stem compartment walls can be without holes or have less than 1 $cm^2$ total of hole openings, e.g., to minimize transpiration, but to optionally prevent excessive buildup of condensate or ethylene gas in the stem compartment.

A compartment divider that substantially reduces migration of gasses and/or fluids between compartments can be formed, e.g., by constricting sealable container walls inward onto flower parts. For example, sealable containers can be compartmentalized by wrapping a filament around the sealable container to constrict the sealable container walls. In many cases, the sealable container is constricted at a level adjacent to the blossoms, e.g., onto the stems just below the flower blossoms. In another aspect, constrictions can be formed by simply twisting the sealable container at the point of desired construction.

In another aspect of the methods, the flower roots or cut stem ends are inserted into a preservative liquid. The preservative can be retained in a preservative container. In some embodiments, the preservative container can be sealed with a filament, or two or more filaments spaced, e.g., on the outside of the preservative container opening along the flower stems. The preservative liquid can include, e.g., water containing one or more flower preservative constituents. For example, the preservative can comprises a thickener, plant hormones, antibiotics, antiseptics (e.g., chemical bactericidals), fertilizing salts, sugars, and/or the like. Large particles (e.g., too large to be in solution or in colloid suspension) are not considered preservative liquid constituents. However, large particles, such as paper fibers, moss, mineral grains, large insoluble or cross-linked polymers, etc., can be mixed with the preservative. In certain embodiments, the preservative liquid is substantially sugar free media.

Flowers previously packaged in one or more sealable containers can be inserted into a shipping container, e.g., for shipping or storage. It is preferred that the shipping container be hermetically sealed around the sealable container of packaged flowers. Once the flowers arrive at their destination, or when a retailer wants to vent the flowers, the shipping container can be removed, e.g., while retaining the flowers in their sealable containers. Often, it is desirable to retain the packaged flowers in a chilled environment during shipping storage and/or display, at a temperature between about 0° C. and about 15° C. In one aspect, the preservative liquid can be changed (replaced with fresh) from 1 week to 3 weeks after initial insertion of the cut stems in the original preservative liquid. During the preservative liquid change, the stem ends can optionally be recut to present fresh cut ends.

The methods of the invention optionally include shipping flowers, packaged according to the methods of the invention within cargo containers by truck or ship. The cargo container can be refrigerated and dark. Fresh, substantially undegraded, flowers can be removed from the cargo containers after more than 7 days, more than 9 days, more than 14 days or longer.

DEFINITIONS

Unless otherwise defined herein or below in the remainder of the specification, all technical and scientific terms used herein have meanings commonly understood by those of ordinary skill in the art to which the present invention belongs.

Before describing the present invention in detail, it is to be understood that this invention is not limited to particular plant preservation methods or devices, which can, of course, vary. It is also to be understood that the terminology used herein is for the purpose of describing particular embodiments only, and is not intended to be limiting. As used in this specification and the appended claims, the singular forms "a", "an" and "the" include plural referents unless the content clearly dictates otherwise. Thus, for example, reference to "a component" can include a combination of two or more components; reference to "a liquid" can include mixtures of liquids, and the like.

Although many methods and materials similar, modified, or equivalent to those described herein can be used in the practice of the present invention without undue experimentation, the preferred materials, methods and systems are described herein. In describing and claiming the present invention, the following terminology will be used in accordance with the definitions set out below.

The term "agar", as used herein, refers, e.g., to any of a variety of aqueous polysaccharide extracts from agarophyte sea weeds, such as *Gelidium, Gracilaria, Ceramium, Phyllophora, Pterocladia, Ahnfeltia, Campylaephora, Acanthopelitis*, and the like. Agar of the invention can include, for example, agar, agarose, phytagar, agar-agar, agarobiose, and phycocolloid. Agar can be, e.g., any member of the family of 1,3-linked galactopyranose and 3,6-linked 3,6-anhydro-L-galactopyranose polymers.

The term "substantially sugar-free", as used in association with the preservative liquids and preservative media of the invention, refers to sugar concentrations below levels at which growth of contaminant microbes in the preservative is significantly stimulated. The term sugar free suggests a preservative without, e.g., significant monosaccharides or disaccharides readily available as an energy supply for microbes. For example, sugar-free media of the invention can have, e.g., less than 0.1% sugar, less than 0.01% sugar, less than 0.01% sugar, or less. As the preservative of the invention can include, e.g., organic materials or thickeners that can include polysaccharides, some small amount of sugars can be present, e.g., as a result of thickener hydrolysis. Not all media used in methods and systems of the invention are substantially sugar free. For certain fungus resistant plants, such as tulips, the presence of sugars in the preservative media can provide a net benefit.

The term "anti-microbial" includes, e.g., antibiotics, anti-fungal agents, antiseptics, anti-microbial plant compositions and extracts that can kill or slow the growth of microbes. Bactericides are materials, other than antibiotics, that kill bacteria, on contact, such as antiseptics. Antibiotics are not considered antiseptics and include bactericidal or bacteriostatic antibiotics.

The term "plant" refers to, e.g., one or more whole plants, uprooted plants and/or cut plants, including cut flowers.

The term "blossom" refers to reproductive structure of some seed-bearing plants. Typically, the blossom includes flower petals and reproductive parts at the upper end of the flower stem.

The term "sealable container", as used herein, refers to a container capable of receiving plants within and having a sealable opening. The sealable opening can include the top opening and/or openings between sealable container compartments formed by constriction of the sealable container. The sealable container can have one or more surface perforations that can allow gas exchange between the inside of the container and the outside environment. Sealable containers, as used herein, can include, e.g., a stem section intended to receive and surround stems of one or more flowers to be preserved, and a blossom section intended to receive and surround the blossoms of the one or more flowers.

The term "constriction", as used herein with regard to the sealable container, refers to a narrowing in the sealable container inner space that defines a boundary between compartments, such as between a stem compartment and a blossom compartment. Such a constriction can effectively seal, or reduce fluid transport through, an opening between the compartments, e.g., so that transport of gasses and/or liquids between the compartments is substantially diminished. One or more constrictions can be used to define and functionally establish compartments in sealable containers.

The term "preservative media", as used herein, refers to a solution and/or colloidal suspension of preservative constituents in water. Water itself is not considered a preservative media.

The term "sealed", as used herein with regard to compartment openings or boundaries between compartments, refers to creation of a seal at an opening between the compartments (or, e.g., at the blossom compartment top opening) so that migration of compartment contents past the seal is not substantial. For example, transport of gasses or liquids across a sealed opening is reduced at least 50%, at least 60%, at least 75%, at least 85%, at least 90%, at least 95%, at least 98% or at least 99%, when the opening is sealed. Compartments can be considered sealed even though the compartment walls may have perforations that allow transport of gasses through the wall.

The term "thickener", as used herein with regard to preservative, refers to a preservative constituent that increases the viscosity of the preservative so that it significantly reduces the ability of the preservative to flow from a preservative container. Particles or insoluble substrates suspended (other than as a stable colloid suspension) in the preservative or holding the preservative are not considered constituents of the preservative.

As used herein, the term "substantially" refers to a parameter that is complete or only incomplete to a small degree (e.g., 99.9%, 99%, 98%, 95% or 90% complete).

A stem "portion", as used herein, refers to the portion of the stem length. For example, the portion of a stem within a compartment is that portion of the total stem length enclosed within the compartment. The portion of several stems enclosed within a compartment is the average stem length proportion for all of the several stems that have at least a part of the stem enclosed by the compartment. In another aspect, the portion of leaves outside a compartment is the average number of leaves outside the compartment on flower stems with at least a part of the stem enclosed by the compartment compared to the total number of leaves on the flower stems.

DETAILED DESCRIPTION

The present invention provides, e.g., preservative liquids, packaging systems, packaging protocols, and methods to preserve plants. Methods and systems can provide a relatively dry, well-ventilated compartment for blossoms, while reducing transpiration from leaves in a relatively high humidity stem compartment. Roots or cut stem ends can be inserted into the preservative liquids of the invention, to preserve the plants by, e.g., providing water, providing media nutrients, inhibiting growth of microbes, reducing ethylene emissions and/or providing plant hormones. Packaging materials of the invention can, e.g., retain the preservative liquid without spills, physically protect the plant parts, control humidity, allow gas exchange, isolate water condensate from contact with plant parts, minimize loss of water, and/or provide a substantially ethylene free, oxygen free or reduced oxygen environment. Methods of the invention can preserve plants, e.g., controlling condensate on surfaces, by providing necessary fluids, slowing plant metabolism, focusing transport of water and nutrients to flower buds, and/or by preventing growth of microbes.

Figure 1:
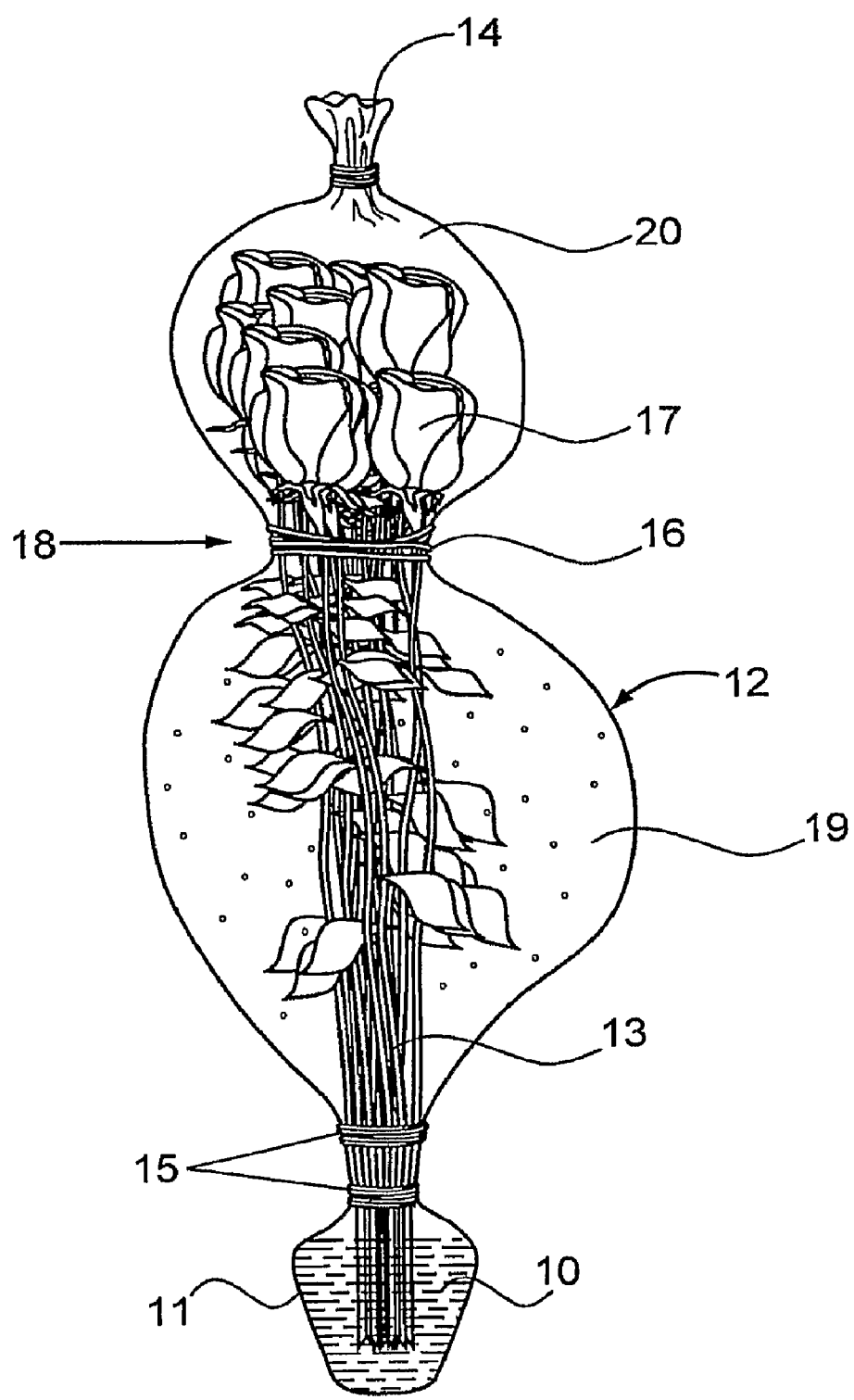
FIG. 1 is a schematic diagram of flower preservation device including a sealed preservative container, a blossom compartment and a stem compartment.

In one embodiment of the invention, as shown for example in FIG. 1, preservative liquid 10 containing, e.g., an agar, an auxin (e.g., indole-3-acetic acid), a cytokinin (e.g., kinetin), copper sulfate, citric acid, baking soda and/or MS salts vitamins, is poured into the narrow bottom end (the "preservative container" 11 section) of a generally conical (before flower packaging deformations) plastic sealable container 12. Flower stems 13 are cut and inserted through the sealable top opening 14 of the sealable container and into the preservative. The cut stem ends and preservative liquid are sealed, e.g., without entrapped air, by constricting the sack onto the stems at the top of the preservative liquid with two spaced filaments 15 (e.g., rubber bands). A constricting filament 16 (e.g., a cable tie) is wrapped around the outside of the sealable container at about the level just below the blossoms 17 to create a constriction 18 defining a boundary and slowing exchange of gasses (e.g., sealing) between the stem compartment 19 and blossom compartment 20 of the sealable container. Optionally, a source of carbon dioxide gas is provided within the blossom compartment. The top opening is then sealed. Packaged in this fashion, the cut flowers can be transported and stored for extended periods, while retaining an attractive appearance and limiting the growth of microbes.

Plant Preservation Devices

The plant preservation devices of the invention can, e.g., inhibit growth of microbes, prevent preservative spilling, retain the vitality of uprooted plants, reduce ethylene emissions and retain the appealing appearance and vitality of cut flowers over an extended period of time. The devices can include, e.g., a sealable container comprising a preservative container, a stem section and a blossom section. Plants can be packaged into the sealable container, e.g., with the roots or cut ends in the preservative container, the stems surrounded by the stem section in a stem compartment, and the blossoms surrounded by the blossom section in a blossom container. Alternately, a significant portion of stems and leaves can be included in a blossom compartment substantially open to ventilation to the external environment. The plants are typically received into the sealable container, e.g., through a opening at the top of the blossom section. The entire sealable container filled with flowers can be enclosed within an outer shipping container to protect and hermetically seal the packaged flowers during shipping and storage. Optionally, one or more sealable containers of flowers can be kept without being enclosed in an outer shipping container (but possibly in a cargo container).

Figure 2:
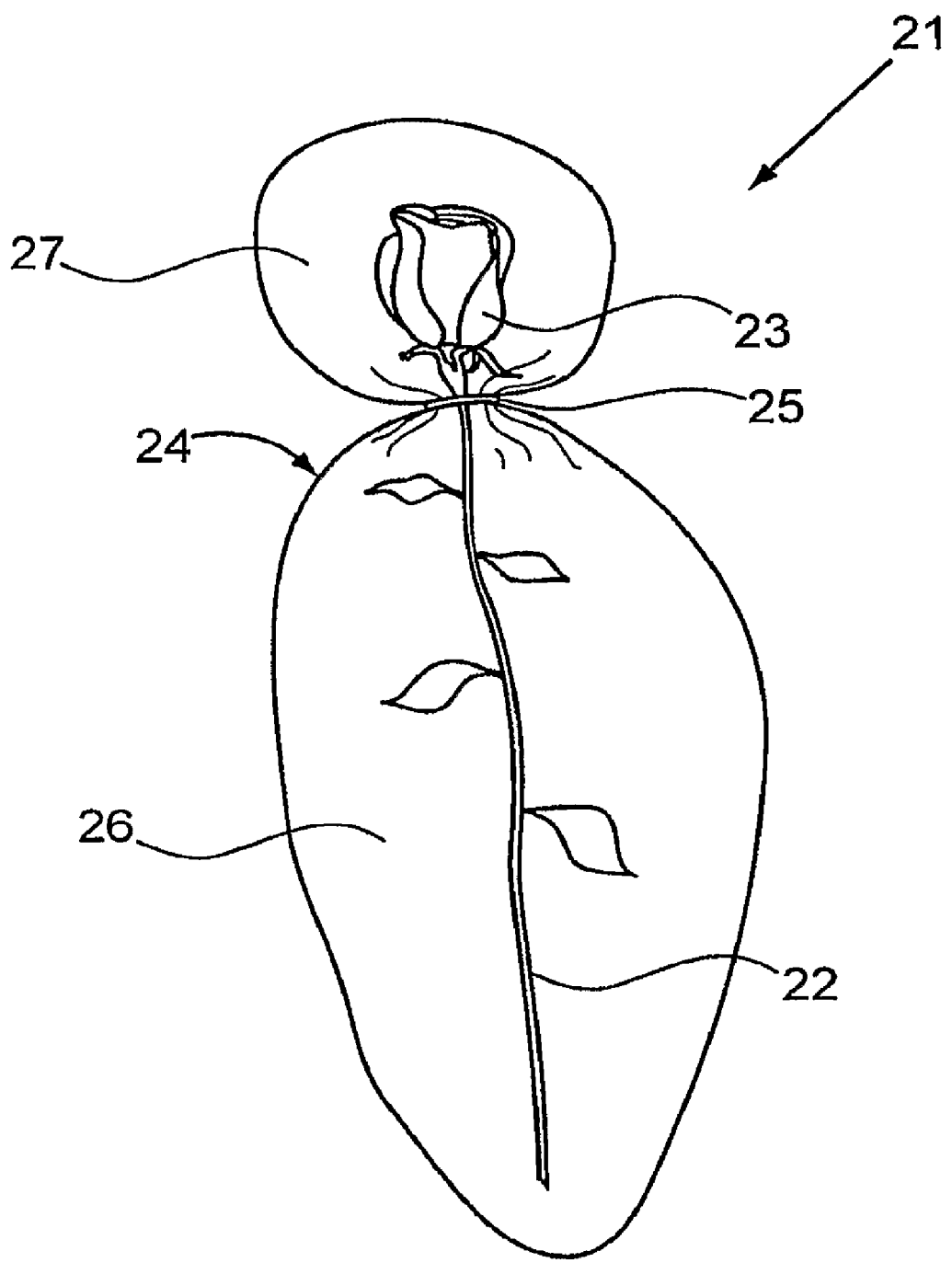
FIG. 2 is a schematic diagram of flower preservation device including a blossom compartment and a stem compartment.

In a basic embodiment of the systems, as shown for example in FIG. 2, plant preservation system 21 can include one or more flowers with stem 22 and blossom 23 packaged within a sealable container 24. A constriction 25 of the container defines the boundary between stem compartment 26 and blossom compartment 27. The structure of the sealable container reduces or eliminates the transport of gasses between the blossom compartment and stem compartment so that, e.g., the separate gas and surface environments can be adjusted for conditions optimal for preservation of the plant. For example, carbon dioxide gas or gas emitting packets can be provided in the blossom compartment to reduce botrytis.

Figure 5:
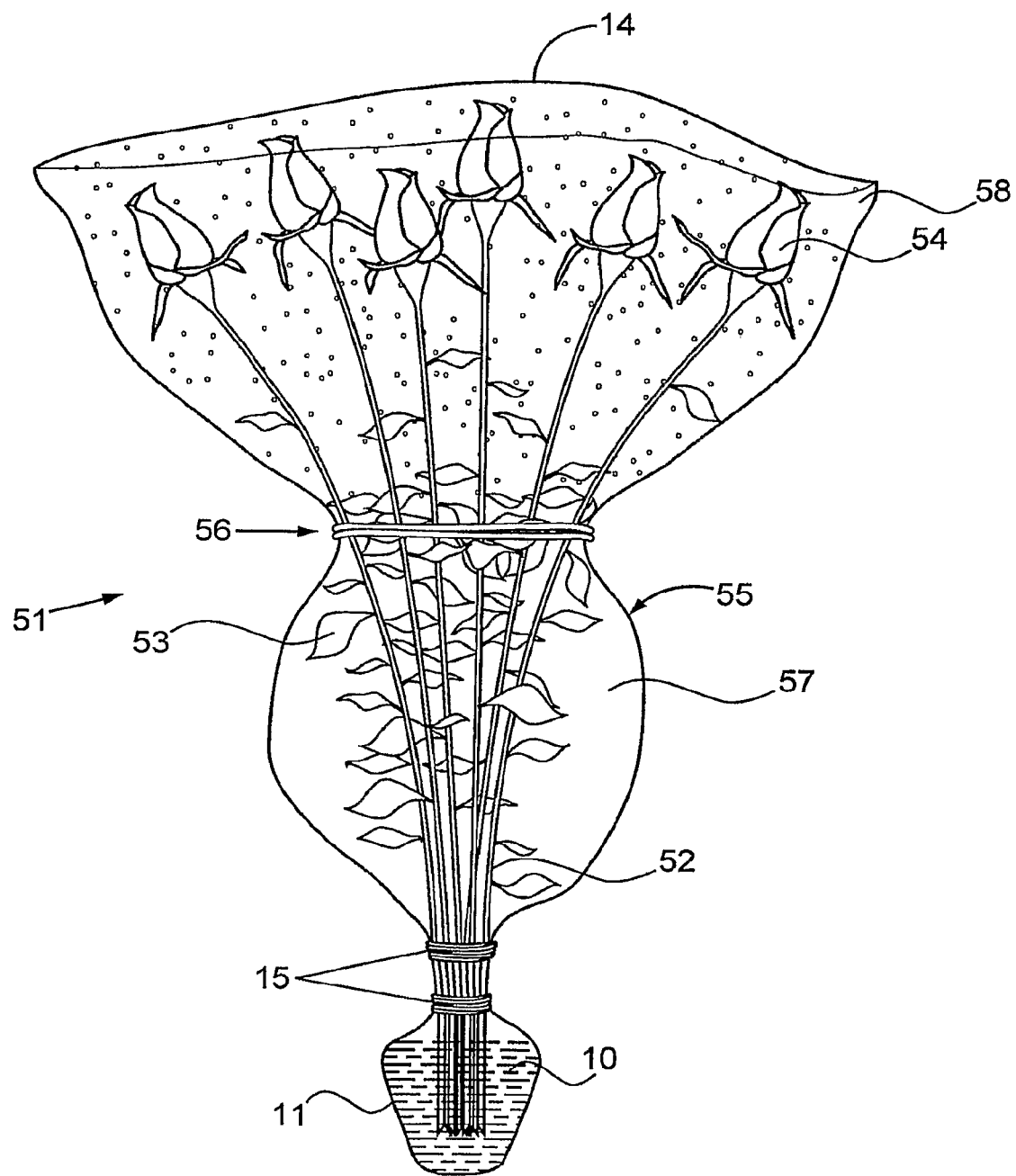
FIG. 5 is a schematic diagram of flower preservation device including a sealed preservative container, and a stem compartment defined by a constriction leaving a portion of the stems and leaves out of the stem compartment.

In another basic embodiment, as shown in FIG. 5, the plant preservation system 51 can include one or more flowers with stems 52 having leaves 53 and blossoms 54 packaged within a sealable container 55. A constriction 56 of the container defines the boundary between stem compartment 57 and blossom compartment 58. The constriction can be at a point along the stem(s) that, e.g., effectively encloses a lower portion of the stem and leaves in the stem compartment with the upper portion of the stems and leaves within the blossom compartment. This configuration can allow effective transpiration in the upper part of the flower to transport water and nutrients to the buds, while reducing the overall loss of preservative liquid due to transpiration from the lower leaves.

In an example of a preferred embodiment, cut roses were preserved in a system essentially as depicted in FIG. 5. About 80% of the leaves were in the stem compartment and about 20% were in the blossom compartment. The packaged flowers were stored, along with unpackaged control roses, for 9 days. After 9 days the control roses were 30-90% suffering from fungal diseases, while 90% or more of the packaged roses were apparently free of disease.

In certain embodiments of the invention, the system can include an inner sleeve. The inner sleeve can be a sealable container having 4-6 perforations (2 mm size) and which defines & covers the stem compartment with a one or more constrictions at a height below blossoms with 4-5 whorls of leaves openly exposed in the blossom compartment. Typically, for preservation of roses and most other flowers, the inner sleeve is surrounded by an outer sleeve (e.g., outer container). The outer sleeve can be, e.g., an outer container that has 100-200 perforations (2 mm size) and is open at the blossom compartment.

Figure 7:
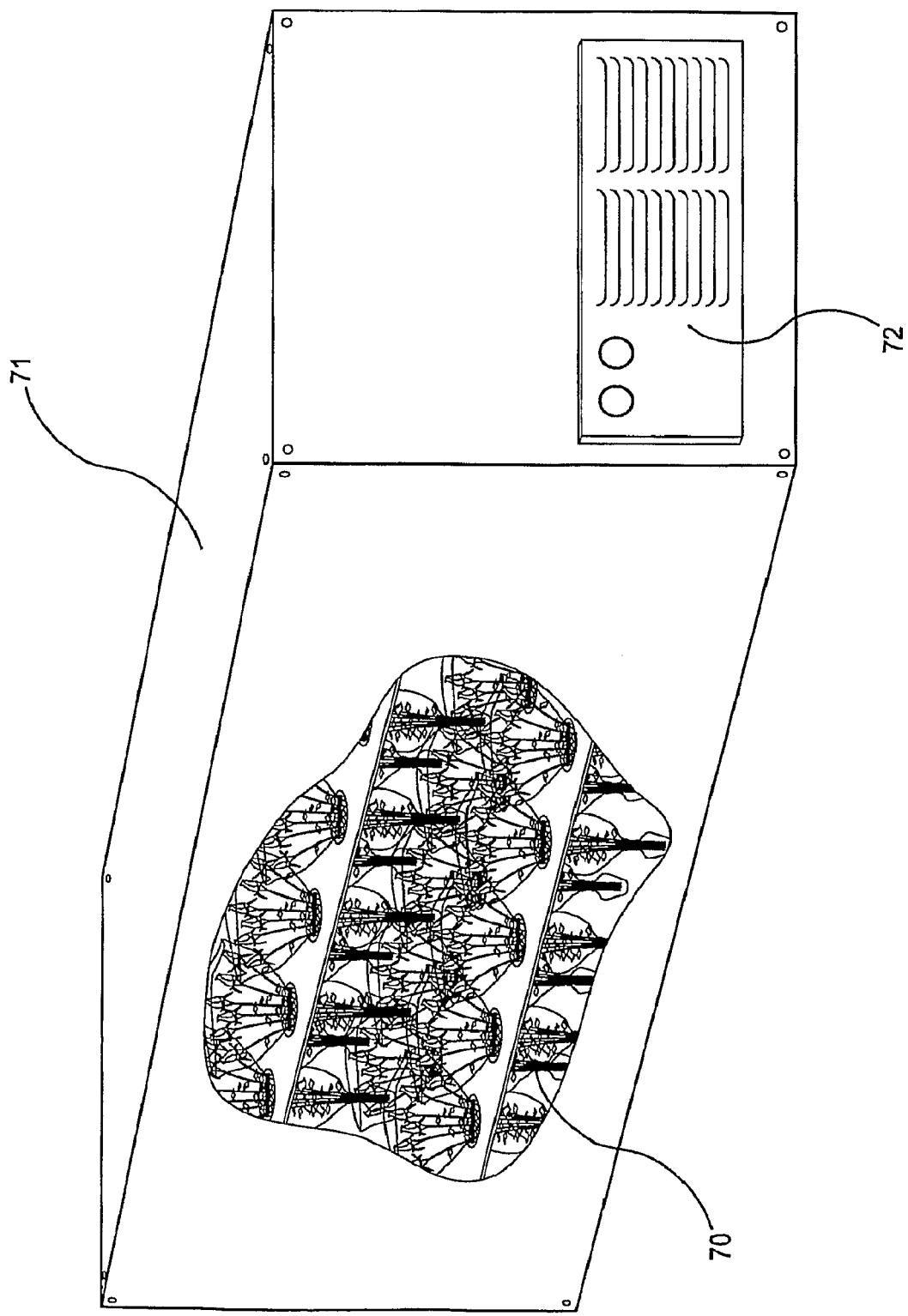
FIG. 7 is a schematic diagram of cut flowers packaged in sealable containers and held in a standard cargo container for shipment by sea or land.

In a preferred embodiment, the preservation system includes multiple seal able containers of flowers held and/or transported in a cargo container. For example, as shown in FIG. 7, two or more packages of flowers 70 in sealable containers, as described herein, can be arranged within a cargo container 71 for holding or shipment. The cargo container can include equipment 72 for air-conditioning and/or dehumidifying the internal environment. For example, harvested flowers can be loaded to a cargo container at a nursery for transit over several days (e.g., more than a week) to be received at wholesale flower market—a journey that with old technology would have reduced the market value of the flowers through damage and spoilage.

This integrated system of cooperative components can provide preservative conditions without the string of equipment normally used to transport fresh flowers. The combined cargo container and sealable container systems of the invention can provide conditions obviating, e.g., the need for: air conditioned warehouses at nurseries, refrigerated trucks to carry flowers to airport, air conditioned warehouses at the airport, loading and unloading aircraft, an air conditioned warehouse at the destination airport, refrigerated distribution trucks at the airport, a distributor warehouse, and/or repeated hydration and transferring of flowers between water containers. The containers of the invention provide structures that can function as a storehouse, an environment control system, a long-term nutrient system, a transit system, a distribution system and a marketing system.

The Sealable Container

The sealable container of the invention can provide, e.g., an ability to form individual compartments with conditions most suitable for various storage conditions and portions of plants to be preserved. Moreover, prevention of substantial spillover of contents from one compartment to another can reduce contamination of plant surfaces with materials, such as preservative media, water, gasses, microbes, etc. that can degrade the overall quality of the plant.

For example, whereas suitable conditions for roots or cut stem ends typically include immersion in a moist matrix or liquid preservative, the stems and associated leaves may be most healthy in a drier environment that allows transpiration and excludes liquid water, and blossoms can be protected from drying and wilting at a high humidity. Under some conditions, with some plants, it may be optimal to provide a dry environment with enhanced transpiration to the upper parts of the plant, while transpiration is minimized in lower plant portions.

The sealable container can be a container that can be compartmentalized, e.g., for use in the methods of the invention. One can imagine sealable containers made from solid (e.g., boxlike) materials with compartments separated by ports (holes, slits, pierceable membranes, flaps, inflatable donuts, elastic sleeves, etc.) that fit closely to plant stems, substantially defining and functionally separating the compartments. However, in preferred embodiments the sealable container is made from a flexible material (such as a plastic film) that can be constricted from the outside to reduce the size of openings between compartments about different plant parts.

Figure 3:
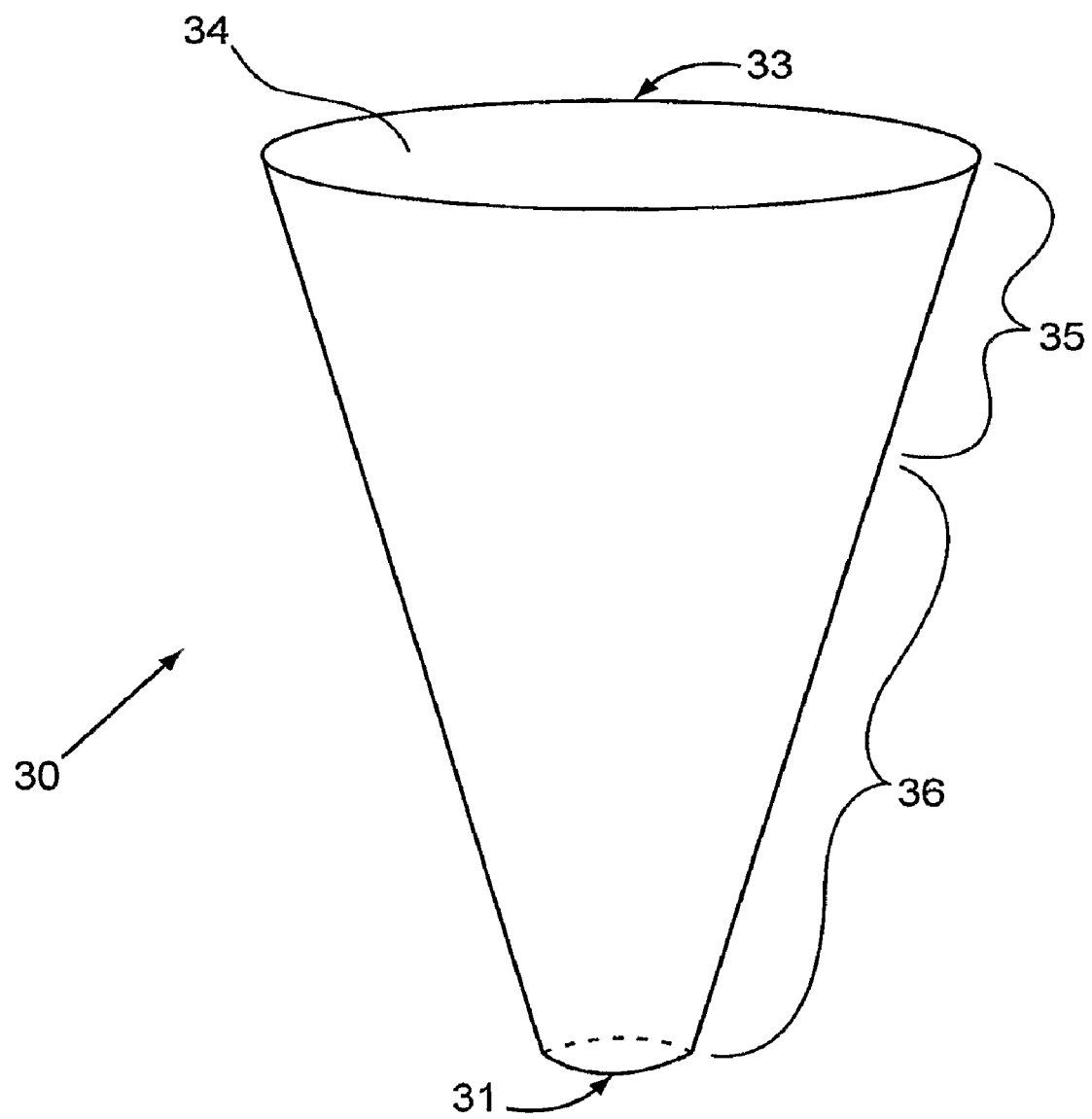
FIG. 3 is a schematic diagram of a typical sealable container.

A preferred embodiment of the sealable container is a conical flexible plastic container with a sealable opening at the wide top end. For example, as shown in FIG. 3, sealable container 30 includes a narrow bottom end 31 and a wider top end 33 with a sealable opening 34. The upper end of the sealable container can include a blossom section 35 intended to enclose flower blossoms in a blossom compartment. Below the blossom section the sealable container includes a stem section 36 intended to enclose flower stems (typically with leaves, and optionally with roots) in a stem compartment. Of course, the relative proportions of the stem section, optional preservative container section, and blossom section can depend on the particular configuration best suited to the particular plant and storage conditions imposed by the external environment. Flexible plastic sealable containers can be made as is understood in the art, e.g., by heat fusing two sheets of plastic membrane together in a pattern similar to that of FIG. 3. The sealable container can be freed from stock plastic sheet by cutting in or near the fused area.

The sealable container of the invention can, e.g., protect plants from damage and/or enclose them in an inert atmosphere. The sealable container can, e.g., allow visual inspection of the packaged plants and provide a final barrier to preservative spillage. The sealable container can be compartmentalized, e.g., into compartments enclosing roots or stem ends, stems (and associated leaves), and blossoms.

As many plants of interest, such as cut flowers, are generally wider at the top than the bottom, the sealable container can have, e.g., a tapered or conical shape. The top of the sealable section can have, e.g., a sealable opening about 1 inch wide, or more, to receive a single small plant. The top of the sealable section can have, e.g., a sealable opening about 4 inches wide, or more, to receive a bouquet of flowers or a bushy plant. In one example embodiment, for preservation of a dozen flowers, the packaging container is a 36-inch long tapered shape with a 6-inch wide base and a 18-inch wide top, sealed and cut from 2 layers of 3 mil polyethylene film. In another embodiment, the sealable container can be, e.g., a cylindrical sleeve of plastic film with a top end opening and a bottom end opening; in such a case, e.g., the bottom opening can be sealed to or around a rigid container to form the preservative container of the invention, while the top opening end can receive, e.g., flowers into the sealable container.

The opening at the top of the sealable container can be flexible to aid in sealing the top of the container. For example, the sealable container can be fabricated from low density plastic 2 mil thick or less, 3 mil thick, 4 mil thick, or more. The top of the sealable container can be gathered, e.g., by folding or twisting, then bent back on itself and fixed in place with a tape, adhesive, band, or clip to form a substantially gas impermeable seal. Other sealable container constructions and seals can be readily appreciated by those skilled in the art.

The body of the sealable container can be flexible to aid in substantially sealing the boundary between two or more compartments of the preservation system. For example, a stem compartment can be effectively sealed from a blossom compartment by constricting the wall of the sealable container to markedly reduce or eliminate open spaces in the cross section at the point between the compartments. In many cases, the constriction will squeeze the walls of the sealable container onto a bundle of stems and/or leaves, so that fluids can move past the constriction essentially only at spaces remaining between the cylindrical stems due to the round packing geometry. Although it might be that such a constriction does not result in a perfect hermetic seal between the compartments, it can still be considered a seal within the meaning of the invention for substantially reducing the ability of fluids to flow between the compartments; the sealing structures functioning to provide different selected environments in the different compartments. Leaves can be squeezed at the constriction with the compressed biomass of leaves acting as a complete or partial barrier between compartments.

All or part of the sealable container inner surface can be textured to, e.g., reduce flower petal wetting and browning from moisture trapped between the petal and the container. A textured surface can, e.g., reduce surface tension forces that can allow moisture condensate to adhere flower petals to the inner sealable container surface. Flower petals "stuck" to the container surface by moisture can become, e.g., wetted, soggy or poorly oxygenated resulting in discoloration and drooping of the flower petal. Provision of a textured (e.g., rough, patterned) inner surface can, e.g., trap gasses and/or substantially reduce the surface contact that promotes surface tension phenomenon, thus reducing sticking and damage to the petals. In some embodiments, the rough texture can result from abundant perforations in the sealable container surface.

The sealable container of the invention can be, e.g., transparent to allow inspection of packaged plants and/or to allow the plants to receive light. A transparent sealable container can, e.g., allow handlers to detect preservative leakage before it escapes the container or harms the appearance of the plants. A transparent sealable container can, e.g., allow wholesale, retail and final purchasers to examine the quality of the plants without breaking the seal. Some cut plants and flowers can, e.g., retain a more pleasant appearance if light is allowed to shine on them through the container.

The sealable container of the invention can, e.g., decrease the loss of moisture and increase the humidity around certain aerial plant parts. Sealing water vapor inside all or part of the sealable container can allow plants can remain packaged longer with less preservative liquid in the preservative container (thus reducing media and shipping costs). A high humidity in the sealable container can, e.g., minimize transpiration and lower plant metabolism for a longer packaged shelf life. In a preferred embodiment, different sections (e.g., preservative container, stem section, and/or blossom section) of the sealable container can have different relative humidity levels. For example, when the bottom end of the sealable container is used as a preservative container, the environment can preferably have a very high humidity, e.g., with significant or abundant liquid water. In many preferred embodiments, the walls of the sealable container in the stem section includes one or more perforations allowing transpired moisture to diffuse out of the stem compartment, resulting in a relatively low humidity in the stem compartment. Optionally, the blossom section walls of the sealable container do not allow substantial amounts of water to escape (e.g., not perforated), resulting in a high humidity or water saturated atmosphere in the blossom section. In other preferred embodiments, the humidity of the stem compartment is maintained at a higher level than the blossom compartment (e.g., with the blossom compartment highly perforated and/or completely open) e.g., when it is important to allow flower buds to remain dry and/or to allow transpiration to transport fresh water, antimicrobials and nutrients to the upper plant parts. Optionally, the compartments formed from the sealable container can provide different levels of carbon dioxide gas in each compartment.

The sealable container of the invention can be, e.g., perforated or imperfectly sealed to allow gas exchange with the external atmosphere in some situations. Perforations are unsealed holes that run completely through the sealable container wall. The sealable opening is not considered a "perforation" as used herein. As shown in FIG. 1, for example, sealable container 12 can have one or more gas exchange perforations 23. Most typically, such perforations in provided either only in the stem section or only in the blossom section of the sealable container. The perforations can number, e.g., from about 3 to about 100, 1000, or more, depending on the size of the container and the gas exchange requirements of the plants. The perforations can range in size, e.g., from about 0.1 mm to about 2 mm, or more. Perforations in a small size range can be, e.g., more numerous for adequate gas exchange, while small enough so that liquids, such as condensate or preservative liquid, can not drain through. Optionally, gas exchange can be promoted by, e.g., leaving open the top opening or provision of an imperfect closure or seal, e.g., the sealable container sealable opening.

The flower preservation system can optionally include a preservative container to hold a preservative liquid. The preservative container can be formed from, e.g., the bottom section of the sealable container, as shown in FIG. 1. The preservative container can be functionally isolated (sealed) from the adjacent stem compartment, e.g., by sealing the opening (top) of the preservative container section onto the flower stems using the constrictive force of one or more filaments applied to the outside of the sealable container at the level between the preservative container section and the stem compartment. Optionally, the preservative container can be an independent bag or rigid container, e.g., with a its own separate sealing system or sealable by constriction of the sealable container walls above the container.

The preservative container can be filled, e.g., with the preservative liquids of the invention, such as, e.g., preservative media of the invention or water with insoluble thickeners. In preferred embodiments, after roots or cut stems are introduced into the preservative liquid, a filament can be, e.g., constricted at, or just below, the preservative top surface so that no air remains below the constriction. Optionally a second filament can be constricted, e.g., about 0.5 inches or more above the first band to form a preservative retention space enhancing the seal between the preservative container and the stem compartment. Additional filaments can be added to provide additional sealing spaces and to increase seal security, e.g., when a flower bouquet is particularly thick, when tipping of the package is expected, when expected handling is aggressive, when the preservative is especially thin, when plants have odd shaped stems, and/or the like.

Filling the preservative container can include, e.g., dispensing preservative into the container by use of a dispensing device, as can be appreciated by those skilled in the art. For example, a dispensing device can include, a container of known volume for manually pouring preservative into the preservative container section of the packaging system, a valve to control flow of gravity fed preservative from a mixing container, pumping preservative from a container, and/or the like. Preferred pumps are peristaltic pumps. Specialized dispensers are commercially available, e.g., with manual and/or automated systems for receiving preservative media concentrate, adding water for reconstitution, blending the water and concentrate mixture, controlling the temperature of the mixed preservative media, and/or dispensing the preservative preparation. Such systems can include, e.g., liquid volume controllers, known in the art (such as those available from, e.g., Inline Filling Systems, Inc. 216 Seaboard Avenue, Venice, Fla. 34292, and others), to control mixture dilution and/or preservative mixture dispensing volumes. Such volume controllers can be manual or automated and can include, e.g., graduate marked containers, discrete or variable stroke valved piston pumps, syringes driven by stepper motors, calibrated peristaltic pumps, positive displacement pumps, and/or the like.

A meniscus of sealant can be entrapped in the sealed space between the filaments (e.g., bands) sealing the preservative container opening, e.g., to further enhance the seal integrity. The sealant can be, e.g., viscous or gelatinous to inhibit the flow of liquids across the sealed space. The sealant can be, e.g., a natural thickener, such as agar, and/or synthetic, such as PVC. In one embodiment, 5 ml of warm 1% liquid agar is poured, e.g., over the stems above the first band before sealing the second band to provide a substantially impenetrable seal of congealed agar in the space formed between the bands.

The preservative container can be fabricated, e.g., from any suitable material known in the art. For example, the preservative container and/or associated flexible sealing sections of the sealable container, can be formed from polyethylene, or other polymer, film 2 mil thick, 3 mil thick, or more. Such a container can be conveniently formed, e.g., by heat sealing a container shape through two layers of film and cutting the container from the film, as is commonly practiced in the art. Optionally, the preservative container can be, e.g., a rigid preservative container sealed to a flexible lower section of the main plastic film sealable container of the plant preservation system. Other polymers useful in fabrication of the preservative container of the invention can include, e.g., polypropylene, poly-vinyl chlorides, poly-ethersulfones, polycarbonate, poly-ethyleneoxides, and/or copolymers thereof.

The preservative liquid held in the preservative container can be, e.g., as described in the Preservative Media section, below. The preservative can have, e.g., a thickener to help reduce seepage of preservative past the first seal. The preservative can be, e.g., degassed under vacuum or by heating to reduce the oxygen available to microbes. The preservative media can include components that react to provide carbon dioxide gas.

The Shipping Container

Flowers packaged in sealable containers, as described above, can optionally be further packaged in an outer shipping container. The shipping container can be a solid or flexible container that surrounds one or more sealable containers having packaged flowers. The shipping container can provide a barrier between the outer environment and the packaged flowers. The shipping container can function, e.g., to prevent physical damage to the packaged flowers, provide a darkened environment, allow condensation in the space between the sealable containers and the shipping container so that the flowers do not become wet, and/or provide a barrier to gas exchange between the packaged flowers and the outside environment. In some cases, a cargo container, e.g., with temperature and/or humidity control, can be considered a shipping container. In a preferred embodiment, flowers are packaged in a sealable container with a stem compartment defined by a constriction; the blossoms and sealable container are packaged in a flexible shipping container having some ventilation (e.g., perforations). In certain embodiments, flowers packaged in sealable containers are further packaged in flexible outer shipping containers, many of which are in turn are loaded into an environmentally controlled cargo container.

The shipping container can be fabricated, e.g., from any suitable material known in the art. As with the sealable container, the storage containers are preferably bags, sleeves or tubes fabricated, e.g., to provide a conical structure, from polyethylene, or other polymer, film 2 mil thick, 3 mil thick, or more. Such a container can be conveniently formed, e.g., by heat sealing a container shape through two layers of film and cutting the container from the film, as is commonly practiced in the art. Other polymers useful in fabrication of the shipping container of the invention can include, e.g., laminated paper products, polypropylene, poly-vinyl chlorides, poly-ethersulfones, polycarbonate, poly-ethyleneoxides, and/or copolymers thereof.

Figure 4:
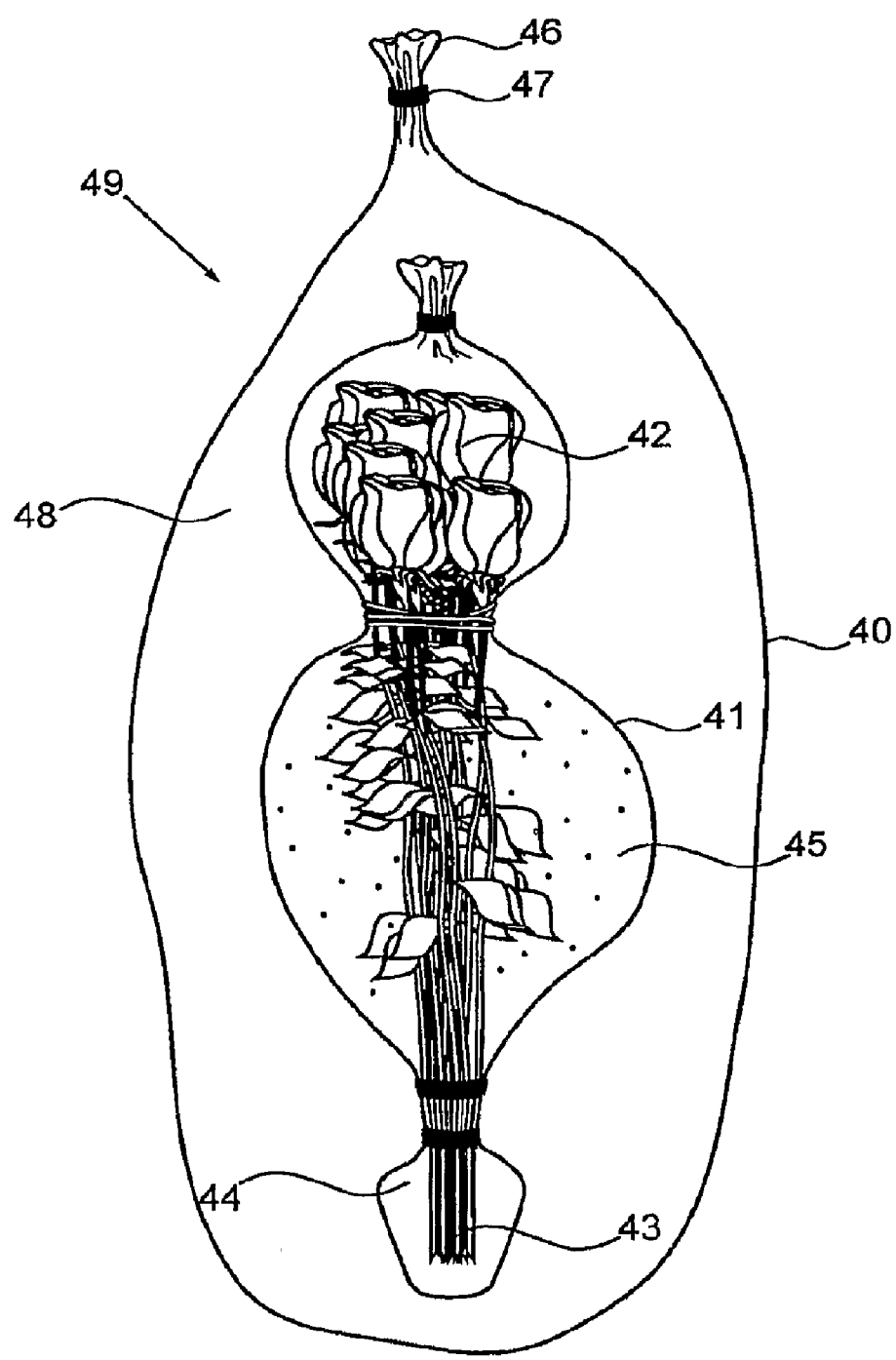
FIG. 4 is a schematic diagram of a preservation device including a shipping container.

In certain embodiments, as shown in FIG. 4, the shipping container 40 is a plastic bag, sleeve, or tube. As the packaged flowers 41 are typically somewhat conical, the shipping container also typically has conical contours, although this is not a requirement. In a particular embodiment, bud flowers 42 packaged, e.g., with cut stem ends 43 immersed in a thickened preservative media 44, and with stems in a stem compartment 45 having perforated walls, is placed in a conical plastic shipping container. The shipping container top 46 is sealed, e.g., with an adhesive, filament 47 or heat seal. Enclosing the packaged flowers within the shipping container creates outer compartment 48 that can have a desired atmosphere, provide pneumatic protection against crushing, and/or collect condensate away from the flowers. The sealed shipping container is typically thus essentially sealed against inward or outward migration of fluids, such as gasses, preservative liquid and condensate. In some embodiments, the shipping container can include carbon dioxide gas that can contact sections of cut flowers in selected open or perforated sealable container compartments, such as the blossom compartment. In some embodiments, the shipping container can have perforations to allow for some gas exchange with the external environment.

Figure 6:
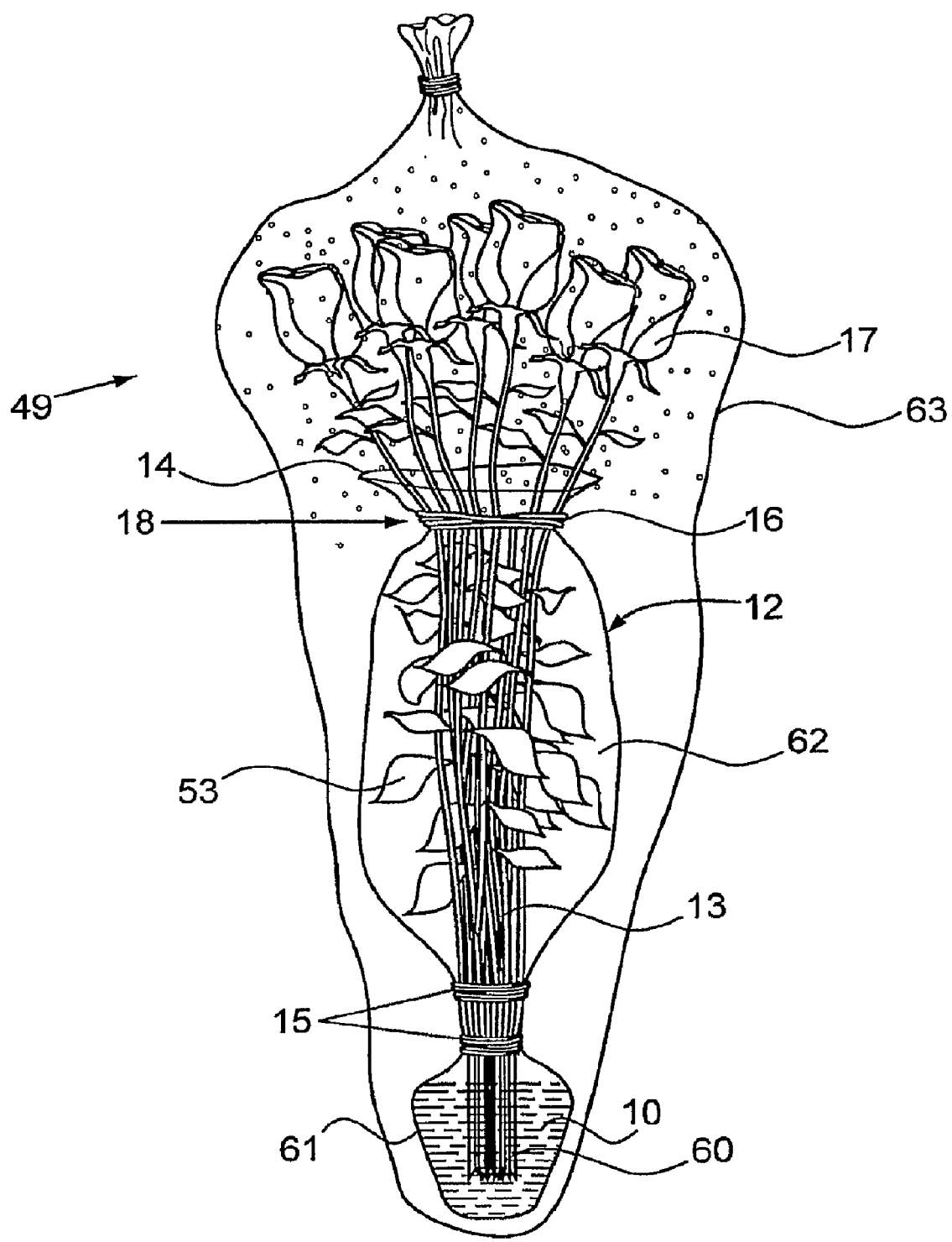
FIG. 6 is a schematic diagram of a preservation device including partial containment of leaves in a stem compartment and overall containment in an outer shipping container.

In another useful configuration of the system, as shown in FIG. 6, the flowers can be packaged with stem ends 60 inserted into a preservative container compartment 61 of the sealable container and most of the stems and leaves sealed within the stem compartment 62. There can be, e.g., essentially no blossom compartment formed by the upper part of the sealable container, but the shipping container 63 can provide a compartment for the blossoms (and optionally, the top leaves). The shipping container can be substantially hermetically sealed. However, in a preferred embodiment of this configuration, the shipping (outer) container is open, or has perforations that allow gas exchange, e.g., with the flower parts not in the preservation container or stem compartment.

The entire preservation system of flowers 49, including the compartmentalized sealable container and the shipping container, can be placed in a large box with many other filled shipping containers, e.g., for shipment by cargo vessel over 7 days time to a distant port. The box can be delivered to a retailer of flowers who removes the shipping containers from the box, and removes the packaged flowers from the shipping containers. The flowers are then exposed to light and gasses are exchanged between the stem compartment and the exterior environment. The sealable opening of packaged flowers for immediate sale can be opened, e.g., 9 days or more after initial packaging in fresh condition. On opening of the sealable container, the blossoms can begin to open. Control flowers, that were never placed in the preservation systems of the invention, typically will have completed blooming and degraded to the point where they no longer have a desirable appearance.

The Preservative Liquid

The preservative media of the invention, e.g., provides inhibition of microbial growth while providing the plants with water and a favorable hormonal environment. Use of preservative media in media containers is typically preferred, but is considered optional. The growth of microbes is inhibited, e.g., by the substantial absence of oxygen in the system, high levels of $CO_2$ in the system, by the absence of sugar in the preservative and/or by the presence of anti-microbials in the preservative liquid. Water, salts and hormones can help prevent abscission (dropping of leaves, fruit and petals) and wilting of the flowers. A thickener can be added to the preservative liquid, e.g., to help limit spillage of the preservative during transport and handling. Soil can be mixed with the preservative liquid, e.g., to provide soil constituents beneficial to some plants. In one embodiment, the preservative liquid of the invention includes, e.g., about 0.6% agar, an auxin (e.g., indole-3-acetic acid), a cytokinin (e.g., kinetin), copper sulfate, citric acid and/or baking soda, and MS salts and vitamins.

Preservative Thickener

A thickener can be added to the preservative of the invention, e.g., to retain water in a form available to roots or cut stems and to minimize spillage of the preservative while the packaged plants are being handled. The thickeners of the intention can be any substance, compatible with the plants and packing materials, which increase the viscosity of the preservative liquid. For example, the thickener of the invention can be any of a variety of hydrophilic natural and/or synthetic polymers. Thickeners of the invention can be, e.g., agar, alginate, carrageenan, gellan gum, pectin, a cellulose derivative plant gums, and/or the like. As used herein, thickeners are constituents of the preservative liquid, but a simple combination of water and a thickener is not considered a "media" of the invention. Insoluble substrates holding the preservative or large (e.g., too large for colloid suspension) particles floating or suspended in the preservative are not considered to be thickeners of the invention. Biodegradable thickeners can be selected, e.g., where sewage or compost disposal of the preservative is desirable after use.

Thickeners can be added to preservative liquids of the invention, e.g., in amounts required to provide a viscous or gelled composition that functions to reduce spills in a particular configurations of the packaging system during transport and handling. Preservative liquids of the invention can include one or more thickeners in an amount ranging, e.g., from about 0 weight percent to about 5 weight percent, from about 0.05 weight percent to 1 weight percent, from about 0.3 weight percent to about 0.7 weight percent, or about 0.5 weight percent.

In one aspect of the invention, for example, the thickener can be an agar. Agars can include, e.g., agar, agarose, phytagar, agar-agar, agarobiose, phycocolloid, and the like. Agars are generally polymers of, e.g., 1,3-linked galactopyranose and 3,6-linked 3,6-anhydro-L-galactopyranose. Agars can be, e.g., crude or purified aqueous extracts of algae or seaweed, such as *Gelidium, Gracilaria, Ceramium, Phyllophora, Pterocladia, Ahnfeltia, Campylaephora, Acanthopelitis*, and the like.

Agar solutions and gels can be prepared by, e.g., adding dehydrated agar to water and heating to near boiling, until the agar is dissolved. The agar can be sterilized, e.g., by autoclaving at 120° C. for about 15 minutes. The agar solution can, e.g., form a gel on cooling which can be repeatedly melted and solidified for pouring or addition to other preservative liquid constituents.

Soil

Soil can be mixed with the preservative of the invention, e.g., to supply beneficial soil constituents to plants. Soil is particularly desirable in preservation of plants retaining their roots. Soil of the invention can be, e.g., clay, loam, humus, kaolin, sand, peat, top soil, compost, potting soil, a mixture of soils, and/or the like. The soil of the invention can be, e.g., contain normal soil microbes or can be sterilized. Soil can be mixed with the preservative of the invention, e.g., in amounts ranging from about 0 weight percent to about 90 weight percent, 30 weight percent to about 80 weight percent, e.g., at about 60 weight percent.

Soil can be present, e.g., as a filler within the preservative liquid or as a matrix holding the preservative liquid. When soil is present, e.g., as a preservative filler of about 10% (by weight), it can act as a source of normal flora and trace elements to the preservative. When soil is saturated with the preservative, e.g., as a water saturated mud having, e.g., about 60% soil by weight, it can minimize preservative spillage and provide a wholesome environment for uprooted plants.

Without being bound to any particular theory, it is believed that soil mixed with preservative liquids of the invention can provide, e.g., beneficial microbes, minerals, trace elements, rooting surfaces, and nutrients to the plants. Anti-microbial agents in the preservative, reduced oxygen and substantial lack of sugar can, e.g., prevent excessive growth of microbes in preservative of the invention including preservative containing unsterilized soil.

Anti-microbials

Bacteria and/or fungi can infest whole plants and cut flowers to degrade their appearance and reduce their shelf-life. Anti-microbials, such as antibiotics, anti-fungals, antiseptics, hypochlorite salts (e.g., bleach), silver nitrate, plant extracts, and copper sulfate or 8-hydroxyquinoline citrate (8-HQC), can be added to the preservative liquids of the invention, e.g., to inhibit growth or these microbes. The choice of anti-microbials depends on, e.g., the threat associated with a particular plant (such as the normal surface microbes) and the presence of other anti-microbial factors in the preservation system (such as anaerobic conditions or the lack of sugars in the preservative liquids and preservative media). For example, where the plants are packaged in an anaerobic container, anti-fungals and antibiotics against aerobic bacteria may not be necessary.

In preferred embodiments, antimicrobials are not used in preservative liquids of the invention. Many antimicrobials, in excess can be detrimental to plant cells and tissues. Many antimicrobials present issues of waste disposal and selective pressures promoting resistance. Antimicrobials can kill normal microbial flora that actually benefit the plants. In preferred embodiments, provision of healthy environments, water and nutrients can substantially prevent detrimental effects of unwanted microbes.

Antibiotics are molecular agents that can kill bacteria or inhibit bacterial growth. Antibiotics are not to be confused with chemical antiseptic anti-microbials, such as the bleach, copper sulfate described above. Antibiotics often inhibit bacteria by interfering with their metabolic processes, such as cell wall formation; as compared to antiseptics, such as chlorine bleach, which destroy microbes by chemical attack. Antibiotics of the invention preferably include, e.g., kanamycin and ampicillin. Other antibiotics, known in the art, such as broad spectrum antibiotics, and/or antibiotics targeted to particular problem microbes, can be beneficially included in the preservatives of the invention. Antibiotics of the invention can be, e.g., incorporated into slow release polymeric compositions to ensure adequate concentrations in the preservative media over time.

Fungi can be common saprophytes, pathogens, or contaminants on plant surfaces. Fungicides can be added to the preservative liquids of the invention to minimize the growth of fungi in the preservative media, plant tissues, and/or plant surfaces. Fungicides of the invention include, e.g., calcium polysulfide, benomyl, chlorothaloni, sulfur, mycobutanil alfa 4-chlorophenyl 1H 1,2,4-triazole-1propanenitrile, copper sulfate, triforine, thiphanate-methyl, nystatin, and the like. The fungicides of the invention can be, e.g., topically applied to the plant or preservative surface. The fungicides can be, e.g., incorporated into the preservative liquid and/or systemically distributed within the cut flower.

Plant Compositions and Extracts

Preservative liquids of the invention can include or be admixed with, e.g., anti-microbial compositions and/or extracts of plants. For example many plants such as neem, eucalyptus, lobelia, wintergreen, hops, juniper, chaparral, thyme, rosemary, and myrrh are known to have anti-microbial properties. Compositions of such plants can be prepared, e.g., by chopping or grinding the roots, stems, leaves, flowers and/or fruits. Extracts of such plants can be prepared, e.g., by effusion of ground plant parts in aqueous or organic solvents to obtain active antimicrobial agents from the plants. Many plant compositions and extracts in the invention can, e.g., provide benefits by controlling insect or nematode pests that can harm the plants.

Extracts and/or compositions of antimicrobial plants can be incorporated into, or admixed with, preservative liquids of the invention in amounts adequate to provide the desired microbe control for a particular preservative liquid or plant. For example, ground neem leaves, or other plant compositions, can be mixed with preservative media of the invention in amounts ranging from about 0.1 weight percent to about 10 weight percent, or at about 1.5 weight percent.

Many of the plant compositions and extracts of the invention can be, e.g., employed on edible plants and/or are environmentally friendly. The natural anti-microbials of the invention can be disposed of, e.g., in compost, land fill and sewage systems without harm to the environment. Many of the anti-microbial plant compositions and extracts can be, e.g., applied to preservative liquids or plant surfaces without rendering the plant unsuitable for consumption by animals or humans.

Absence of Sugars

Preservative liquids and media of the invention can be, e.g., substantially sugar-free. Whereas, preservation media in the cut flower industry usually include one or more sugars (e.g., see Quiding, cited above, and U.S. Pat. No. 5,536,155, "Preservative of Cut Flowers" to Futaki, et al.), preservative liquids and media of the present invention can be provided, e.g., without added sugars. Although sugars can provide some nutritional benefit to some cut plants, they can also stimulate growth of bacteria and fungi that can destroy the plants. Without being bound to a particular theory, plants in the preservative liquids and/or inert gasses of the invention, e.g., appear to receive adequate metabolic sugars from internal starch storage, and/or photosynthetic mechanisms, to retain a vital appearance and a long storage life without requiring significant amounts of sugar from the preservative liquid.

Water is not considered sugar-free preservative media of this invention. Because water is not considered a media (media, as understood by those of skill in the art, and in the context of this specification) are, e.g., systems of constituents dissolved and/or colloidally suspended in water). Although traces of sugars may be present in preservative media of the invention (e.g., as residue or degradation products of certain thickeners) the preservative liquid can be considered sugar-free if the amount of sugar is not substantial. Insignificant amounts of sugar are not substantial. The amount of sugar in preservative liquid is not significant if it does not significantly (e.g., a 95% confidence) increase the growth of plant degrading microbes over the same preservative liquid without the sugar.

Plant Hormones

Exposure of plants to plant hormones in the preservative media and devices of the invention can affect the quality of the plants. Plant hormones can include certain small molecules such as, e.g., auxins, cytokinins, gibberellins and the like. The right combination of hormones in the preservative media and/or devices of the invention can, e.g., control flower bud opening, increase stem turgidity, and prevent abscission. Such combinations can be different from one type of plant to the next. Plant hormones can be constituents of the preservative media of the invention and/or can be applied to the surface of plants, e.g., by dipping or spraying.

Indole-3-acetic acid (IAA) can be added as constituents of preservative media, e.g., to help maintain an attractive appearance in the cut flowers and extend vitality. IAA is an auxin associated with stem growth and can be considered an anti-aging agent. The preservative media of the invention can include auxins, such as IAA, in an amount ranging from about 0 mg/L to about 20 mg/L, in an amount ranging from about 3 mg/L to about 10 mg/L, or at a concentration of about 5 mg/L. The optimal concentration can vary, e.g., with plant type, plant age, combinations with other hormones, etc. Beneficial concentrations can be determined, e.g., empirically under a variety of conditions with cut flowers in the preservative media of the invention.

Other plant hormones useful in controlling the appearance and shelf-life of plants in the invention include, e.g., cytokinins and gibberellins. Cytokinins, such as kinetin, 2iP or BAP (benzylaminopurine), are known to influence, e.g., cell division and cell elongation in plants. Gibberellins are thought to be important in, e.g., normal plant height, leaf maturation, flower development and fruit development. The proper combination of cytokinin and gibberellin concentrations, e.g., in combination with IAA, can provide extended plant survival and improved appearance in storage. Preservative media of the invention can include, e.g., cytokinins, such as kinetin or BAP, in an amount ranging from about 0 mg/L to about 20 mg/L, in amount ranging from about 3.5 mg/L to about 15 mg/L, or at a concentration of about 7 mg/L. Preservative media of the invention can include gibberellins, such as $GA_3$, in an amount ranging from about 0 mg/L to about 5 mg/L, ranging from about 0.3 mg/L to about 2 mg/L, or at a concentration of about 1 mg/L. The actual optimum concentrations can vary, e.g., with plant type, plant age, combinations with other hormones, etc. Beneficial concentrations can be determined, e.g., empirically under a variety of conditions with plants in the preservative media of the invention.

In another aspect of the invention, for example, aerial portions of cut plants can be treated with cytokinins and/or gibberellins to stimulate root propagation and/or floral budding. Incorporation of materials to packaging materials is not considered to be application to plant aerial parts. Without being bound to any particular theory, it is believed that gradients with different ratios of plant hormones between regions of a plant can strongly influence induction of growth. For example, increasing concentrations of auxins towards a cut stem and increasing concentrations of cytokinins towards aerial tips provides a high ratio of auxins to cytokinins at the cut stem that can induce root growth. In the invention, such gradients can be generated, e.g., in a cut flower by providing auxins in the preservative media and by spraying a solution of cytokinins onto the aerial plant parts (i.e., those parts not in soil or within preservative liquids). Root growth can be further stimulated, under these conditions, by providing a series of holes in the cut stem.

Other Preservative Media Ingredients

Salts, buffers and other small molecules can be added to the preservative media of the invention to provide osmotic balance, pH control, trace elements, cofactors, nutrients, and the like. Plant tissue culture salt formulations, known in art, can provide, e.g., useful supplements to the preservative media of the invention. For example, Murashige and Skoog's (MS) salts, Gamborg's vitamins, White's salts, Kao and Michayluk (KM) salts and vitamins and the like, can be incorporated into the preservative. Aqueous solutions can be formulated, e.g., from commonly available plant media components, such as ammonium nitrate, boric acid, citric acid, calcium chloride, cobalt chloride, cupric sulfate, EDTA, ferrous sulfate, magnesium sulfate, sodium molybdate, potassium iodide, potassium nitrate, potassium phosphate, zinc sulfate, myo-inositol, nicotinic acid, pyridoxin, thiamine, and/or the like. The final media preparation can have a pH adjusted, e.g., within the range from about 3 to about 8, or to about pH 5.6. Some ingredients may have to be dissolved separately in a special solvent, at a certain temperature, and/or at a particular pH, before addition to the media.

Cut Rose Preservation Media

The preservation media of the invention can be, e.g., adjusted to formulations well suited to particular types of cut flowers. For example, a preservative media formulation well adapted to preservation of cut roses can include, e.g., Murashige and Skoog's salts, Gamborg's vitamins, 7 mg/L kinetin, 5 mg/L IAA, 5 mg/L 2iP, 1 mg/L gibberellin, 250 mg/L $CuSO_4.5H_2O$, and 5.5 g/L phytagar. Final salt concentrations of about 1000 mg/L ammonium nitrate, 200 mg/L calcium chloride, 100 mg/L magnesium sulfate, 1000 mg/L potassium nitrate, and/or 100 mg/L monobasic potassium phosphate can provide favorable results in cut rose preservation media.

Cut rose preservation media can be prepared, for example, by dissolving the salts in water. The solution can be adjusted, e.g., to pH 5.6. Phytagar can be, e.g., added to water, dissolved and heated separately to prepare a melted solution. The salt solution and melted agar can be, e.g., mixed together with a quantity of additional water to obtain the desired final media component concentrations. The resultant mixture can be, e.g., autoclaved (this is often not necessary since the preservative liquids, devices and methods of the invention can inhibit microbial growth without the requirement of absolute media sterility). Phytohormones and anti-microbials can be, e.g., dissolved in special solvents, at suitable pH, and filtered, as necessary. After the media mixture has cooled, e.g., to about 45° C., or less, the hormone and/or anti-microbial solutions can be mixed into the final preservative media. The preservative can be, e.g., poured immediately into plant storage containers, or heated later for pouring.

Strawberry Plant Preservation Media

The preservation media of the invention can be, e.g., adjusted to formulations well suited to particular types of whole rooted plants. For example, a media and matrix formulation well adapted to preservation of whole strawberry or grape plants can include, e.g., 150 ml (about 250 g) of sandy soil, 75 ml water, 5 g ground neem leaves, and 200 ppm 8-HQC or 250 ppm $CuSO_4.5H_2O$. The soil can act, e.g., as a buffer and source of nutrient salts. More water can be included, e.g., if the sealable container is perforated; less if the sealable container is sealed with inert gas.

Packaging Systems with $CO_2$ Rich Compartments

Gasses can be useful in controlling plant metabolism and to reduce growth of microbes in the plant packaging systems of the invention. In a particular aspect, it can be beneficial to expose flower blossoms to higher levels of carbon dioxide, e.g., while the leaves are exposed to lower levels. By exposing the blossoms to increased levels of carbon dioxide, fungi and botrytis causing microbes are inhibited from growing on the delicate structures. Meanwhile, it can be desirable to retain the more hardy leaves in a relatively low carbon dioxide environment (e.g., without added $CO_2$), e.g., so normal leaf metabolism can carry on, albeit at typically low levels.

Additional carbon dioxide can be introduced to blossoms in packaging systems described herein. For example, the carbon dioxide can be in the form of dry ice. Packaging system compartments can receive, e.g., 1 to 100 g of dry ice, 2 to 50 g, 5 to 25 g, or about 15 g. In preferred embodiments, the dry ice can be placed in the blossom compartment blossom compartment or the space defined between a sealable container and outer shipping container 63. In other embodiments, carbon dioxide can be provided through chemical reactions, e.g., acidification of a carbonate. For example, calcium carbonate or bicarbonate of soda can be exposed to, e.g., citric acid to provide slow emission of carbon dioxide. In preferred embodiments, either the acid or carbonate is in solid form, and the other is in a liquid or gel form. For example, a packet of carbonate powder can receive an acid solution and then be placed into a compartment of the systems before closure of the packaging system.

In a preferred embodiment, carbonate can be present in the preservative media and acid solution can be added before sealing of the system. For example, the packaging system of FIG. 6 can be modified to include ventilation of the preservative container 61 (e.g., with vent holes or provision as an open topped container). The media 10 can be supplemented with baking soda (about 1 g/L or more of the media), then a dry solid or liquid form of an acid can be added to the media at the time of packaging. The carbon dioxide gas thus formed can fill a compartment common to the blossoms, but separate from the leaves.

In one aspect, flowers packaged as in FIG. 1 can have carbon dioxide introduced into blossom compartment. For example, dry ice can be wrapped in a packet having thermal insulation and vent holes. The thermal insulation can protect the blossoms from the cold dry ice and reduce the rate of conversion of the dry ice to gas. Optionally, the flowers can be dry packaged, as in FIG. 2, with a carbon dioxide evolving packet in the blossom compartment 27.

Methods of Preserving Plants

Methods of the invention employ, e.g., preservative media, liquid sealable containers, gas permeable compartments and/or gas sealable compartments to preserve plants. In one embodiment, for example, cut stems of flowers are inserted into a preservative media, stems and leaves are enclosed in stem compartment free gas exchange with the exterior, and the flower buds are enclosed within a blossom compartment without significant gas exchange with the exterior environment. In another embodiment, five containers of packaged flowers are sealed within a plastic outer shipping container. In a more preferred embodiment, cut flower stem ends are placed in a preservative media container, the flowers are placed into a sealable container and a constriction is made closely about the stems at a point below a significant number of the top leaves. In this configuration, the major portion of active transpiration transports water and preservative liquid to the top of the plant. The flower buds stay dry due to the open sealable container top. Optimal water and nutrients are thus provided at the buds while denying moisture to undesirable microbes at the top of the plant. In another aspect of the invention, flowers packaged according to the methods are held or transported in cargo containers, e.g., controlling temperatures and humidity.

Methods of the invention preserve plants by, e.g., combining plant sustenance techniques with microbial inhibition techniques, condensation localization, and gas composition and exchange control. For example, the preservative media can supply plants with water and auxins and/or cytokinins, while the media and packaging can deny sugar and oxygen to the microbes. Ventilation of the leaves and stems can allow the leaves to remain dry while they exchange oxygen or carbon dioxide, as necessary for normal metabolism. The outer shipping container can protect the flowers against crushing and reduce gas exchange, e.g., while the packaged flowers are being transported. Certain compartments can receive supplemental carbon dioxide to control metabolism and reduce microbe growth. The plants can thereby, e.g., retain a fresh appearance without being attacked by bacteria and/or fungi.

Sustaining the Cut Flowers

When flowers are cut, they can rapidly lose their attractive appearance. Almost immediately, water lost to transpiration from the leaves can not be replaced, so the flower wilts. Later, even if the cut flower stems have been placed in water, hormonal and enzyme systems can degrade the flower so it becomes discolored and loses flower petals and leaves. The flowers can be physically traumatized by routine handling in commerce. Water, condensation on flowers and shipping materials can suffocate plant tissues and provide a breeding ground for undesirable microbes. Degradation of the flowers can be aggravated by accumulation of ethylene gas and bacterial or fungal infestations. On the other hand, degradation of cut flowers can be delayed by providing, e.g., conditions of humidity control, hormone balance and nutrition that can help sustain vitality.

Placing the cut ends of flower stems in water can help maintain turgor pressure and delay wilting. For many flowers, it is important to place the cut stems immediately into water, or to make the cut under water, to avoid transpiration drawing air bubbles into the stem vasculature and blocking the flow of fluids. The methods of the present invention provide water to the cut stems, e.g., in the form of preservative liquid or media. Cut stems or retained roots can be, e.g., immediately dipped into the preservative and held within the preservative container filled with preservative media or, optionally, water. The preservative container can be sealed with bands, as described above, so that no air can reach the cut stem ends. As the preservative media is transported up into the flowers, a preservative container formed from flexible materials can, e.g., collapse so air is not drawn in to replace consumed preservative liquid. The stem can be cut at a diagonal to increase the surface exposed to preservative liquid and the cut ends can be suspended away from container walls to avoid flow blockage by the preservative container inner surface.

A series of puncture holes can be optionally made, e.g., in the sides of the stem near the cut end, to provide a route of water entry into the stem vasculature even if the cut ends become blocked. The holes can be, e.g., placed longitudinally and/or radially along the stem where there is contact with the preservative liquid. The holes can range in size, e.g., from about 0.1 mm to about 2 mm, and number from about 3 to about 100 per stem.

Small molecule additives to the media, such as, e.g., salts and vitamins, can help maintain the vitality of cut flowers, as is known in the art. Salts, vitamins and trace elements can help the living cut plants to continue normal plant metabolism and physiology, even where roots are lacking. The proper balance of salts can provide, e.g., a beneficial pH and osmotic balance.

Having a thickener in the preservative liquid can help supply water to the cut flowers. For example, the thickener can prevent preservative liquid from being shaken off the cut end during handling so that air does not enter the stem vasculature. The viscosity of thickeners can stop preservative liquid from leaking out of the flexible container so it remains available to the cut ends, without contaminating aerial plant surfaces. The thickener can keep preservative liquid from spilling onto flowers in the sealable container where it can foul the appearance of the flowers and promote the growth of microbes. Contact and interaction of flower stems or roots with semi-solid gel may promote plant health by more closely simulating natural conditions than does a purely liquid media.

Plant hormones in preservative media, such as, e.g., auxins, cytokinins, and/or gibberellins, can extend the attractive shelf life of cut flowers by providing chemical messages promoting vitality and/or reducing messages that promote wilting and abscission. For example, the presence of the auxin, IAA, in the preservative media of the invention can send a hormonal message promoting growth and delaying blossoming of flowers. Cytokinins (e.g., 2iP, Kinetin or BAP) can delay abscission by limiting the generation of ethylene. Consequently, flowers can, e.g., appear fresh and remain in bud-state longer.

Some plants can develop roots, e.g., in the presence of preservative media of the invention, particularly with media containing auxin, such as IAA, IBA, NAA (alone or in combination). In such cases, e.g., the vitality of the cut flower can be improved. Application of a cytokinin, e.g., to the aerial portions of the plant can further stimulate root development. The value of the cut flowers to the end customer, e.g., can be increased, since the flower can be planted in soil for continued enjoyment.

In one aspect of the methods, the sealable container is perforated, e.g., to allow exchange of gasses with the external atmosphere. This venting can have certain advantages for preserving some cut flowers. Venting can reduce ethylene levels, e.g., for cut flowers that generate large amounts of ethylene or which are particularly sensitive to ethylene. Venting can, e.g., lower the humidity inside the container, or separate compartments within the sealable container, so that water condensation does not saturate flower parts or provide an environment for growth of microbes. Venting can, e.g., prevent injury to flower parts caused by expansion and contraction of the container volume caused by air pressure changes experienced in the cargo hold of a jet aircraft. The perforations can be manufactured into the sealable containers or perforations can be made at appropriate times, e.g., into the stem compartment walls after the plants are received by a retailer or end user.

In another aspect of the plant preservation methods, e.g., the inner surface of the sealable container is texturized. Such a texture can inhibit sticking of flower petals to the sealable container surface, as described in the Sealable Container section above, e.g., to reduce water damage to the petals.

In preferred embodiments of the methods, separate parts of the flowers are exposed to environments most conducive to preservation of the flower as a whole. For example, a sealable container can be configured to have three main sections—a preservative container section, a stem section, and a blossom section. The preservative container section can provide roots or cut stems with the liquid water and/or preservative media constituents required to replace fluids lost from upper plant surfaces during the normal course of events. In some embodiments, the stem section can be clear and allow gas exchange from the stems and leaves, through perforations in the walls of the sealable container. The blossom section can be textured and sealable against gas exchange. In many cases, although gasses can migrate between a blossom compartment and a stem compartment, a constriction can reduce the rate of gas exchange and establish, a gradient of gasses along a path from the blossom section to the stem section. In other embodiments, the constriction can substantially seal the stem and blossom compartments from gas exchange with each other. The juncture between the stem compartment and preservative container can be well sealed to prevent contamination of upper plant parts with preservative liquid. The juncture can be just below the blossoms (excluding leaves from the blossom compartment) or the juncture can be below a number of the top leaves.

Sustaining Whole Plants

Whole plants, which retain their roots (e.g., rooted flowers), can be maintained in a vital state for extended periods by using the preservative media and packaging techniques of the invention. Whole plants can be sustained, e.g., using the preservative media and packaging described in the Sustaining Cut Flowers section above. However, whole plants can be more hardy because, e.g., they can exclude air and microbes that would injure cut plants. On the other hand, certain hormones and anti-microbials, e.g., may not effectively penetrate whole plants. Although whole plants can thrive, e.g., in cut flower preservative liquids, they can have distinctly different optimal preservative media conditions.

As the root interface with preservative liquids can, e.g., control exchange of salts, the liquid of whole plant media can have less stringent buffer and osmotic control parameters than for cut flower media. Necessary nutrients, such as salts and trace elements, can be absorbed, e.g., from media with low concentrations of the nutrients or simply from water which has leached nutrients from soil of the preservative.

The root interface with the media can, e.g., provide a barrier to gasses. Air in the preservative liquids of the invention will not, e.g., be drawn into the vasculature of the plant to block flow of fluids. Whole plants can therefore tolerate, e.g., absorption of water from a soil substrate beyond the point where gasses intrude.

Inhibiting Microbial Growth

Bacterial and fungal infestation are a significant cause of product waste in the cut flower industry. The methods of the invention can prevent such infestations, e.g., by creating environments unfavorable to growth of microbes. The preservative liquid and container systems of the invention, e.g., limit the availability of surfaces, oxygen, and nutrients, necessary to the growth of the microbes. For example, by provision of relatively dry and open blossom compartments, microbial attack on blossoms and buds can be reduced.

In a preferred embodiment, microbes are controlled in shipping by a system of humidity controls provided by, e.g., sealable containers, physical arrangements, shipping containers, cargo containers, temperature controls and/or dehumidification. The major source of humidity during plant shipping and storage is transpiration from the plant leaves. The plant part most sensitive to high humidity and condensation is the flower. The present invention teaches a variety of means to reduce exposure of blossoms to humidity, e.g., from the leaves. Constriction of a sealable container to form a stem compartment holding the bulk of the leaves can reduce the dissipation of water from the leaves into the environment around the blossoms. Arrangement of the flower blossoms so that a space exists around individual blossoms for air circulation can enhance diffusion of moisture away from blossoms and prevent accumulation of condensate on the blossoms. Because stem compartments are typically not hermetically sealed, shipping containers with significant ventilation can ensure humidity levels around blossoms does not reach the levels attained in the stem compartment. Temperature controls and/or darkness, e.g., within a cargo container, can significantly reduce the rate of transpiration from leaves reducing humidity and condensation in the blossom compartment. Removal of moisture from surrounding air, e.g., by ventilation or dehumidification, can keep the flowers dry while allowing significant transport of plant fluids and/or media to the blossoms and leaves exposed to the blossom compartment. Combinations of two, or three, or more of these practices can, e.g., avoid humidity and moisture condensation that can prompt the germination of botrytis causing fungi which can brown petals.

In preferred methods of the invention, an environment of relatively high humidity and an environment of relatively low humidity are established. Flowers are preserved by placing at least 50%, at least 60%, at least 75%, at least 90%, or at least 95% of the flower stems and/or leaves in the relatively high humidity environment. A relatively high humidity environment, e.g., for leaves of flowers can have a relative humidity at least 5%, at least 10%, at least 20%, at least 35%, or at least 50% higher than the relatively low relative humidity, e.g., for blossoms of the flower. For example, leaves can be in a relatively high humidity environment of 85% relative humidity as compared to a relatively low humidity of 75% relative humidity—the leaf environment having a relative humidity 10% higher than the blossoms.

Fungi and aerobic bacteria need oxygen to grow and multiply. The preservative liquid and gasses of the invention can, e.g., deny oxygen to microbes present in the cut flower preservation system. Carbon dioxide can be provided in compartments, as described above, to reduce microbe growth. Preservative liquids of the invention can be degassed, e.g., under vacuum or by heating before pouring into the flexible container. Thickeners can, e.g., reduce transport of oxygen from the air into the in the preservative liquid caused by liquid mixing. As sealing bands are placed at the opening of the flexible container, preservative can, e.g., be squeezed up to the seal so that no air space remains in the container. Air in the sealable container can be, e.g., substantially eliminated by introduction of inert gasses, as described in the Sealable Container and Shipping Container sections, above. The oxygen reduction methods of the invention can, e.g., mitigate the need to protect cut flowers with anti-fungals and antibiotics.

Preservative liquids and media of the invention can be, e.g., substantially sugar-free. Sugars are a ready source of the energy necessary for the growth of many microbes. Sugars are not required in preservative for many plants since they can obtain adequate energy from carbohydrate storage and/or photosynthetic processes. The substantial lack of sugar in preservative of the invention can, e.g., significantly reduce the microbial infestation of uprooted plants and cut flowers.

Some bacteria and fungi use surfaces to grow and spread. For example, some fungi require a surface to raise sporangium into the air for spreading of spores. The methods and devices of the invention can, e.g., deny surfaces to the microbes. Sealing the flexible container, e.g., without an air space can substantially eliminate the preservative/air interface. The sealing space defined by two filaments of this invention, as described above can, e.g., prevent preservative liquid spillage and creation of preservative surfaces within the sealable container. In one aspect of the invention, perforations in the sealable container can, e.g., prevent condensation and formation of wet surfaces in the container.

Preservative liquids of the invention can, e.g., limit the availability of water to microbes. The thickeners, gels, salts, and/or soil of the preservative can absorb or complex with water of the preservative liquid, e.g., making it unavailable to undesirable microbes. Limited availability of water can inhibit growth of some bacteria and fungi so they can not damage packaged plants.

Antimicrobials, such as antibiotics, bactericidals, antiseptics and anti-fungal agents, e.g., as described in the Preservative Media section, can be used to limit microbial infestations of cut plants. These anti-microbials can be added to the preservative liquids of the invention or, on some cases, applied to flower surfaces. Natural anti-microbial agents, such as, e.g., plant compositions and plant extracts, can be used where plant consumption by humans is contemplated. The need for anti-microbials can be, e.g., reduced or eliminated by practicing the nutritional, oxygen reduction, sugar reduction and wet surface reduction methods of the invention.

EXAMPLES

The following examples are offered to illustrate, but not to limit the claimed invention. One of skill will recognize a variety of parameters that can be altered while obtaining substantially similar results.

Preservation of Cut Roses in a Package with Partial Leaf Enclosure

A bunch (e.g., 25 roses) of freshly cut roses in early bud are selected and the cut ends placed in hard plastic preservative container of preservative media. The preservative container includes a pierceable membrane cover, through which the flower cut ends are inserted into the preservative. The preservative contains an agar (phytagar) at 6 g/L, an auxin (e.g., indole-3-acetic acid at 5-10 mg/L), a cytokinin (e.g., BAP at 5-10 mg/L), copper sulfate at 100-300 mg/L, citric acid at 1-3 g/L, baking soda at 1-3 g/L and MS salts & vitamins (or KM salts or vitamins).

The preservative container and flowers are placed into a conical plastic bag sealable container so that the preservative container is securely received into the bottom section. A twist tie is constricted around the sealable container just above the level of the preservative container top to retain the preservative container in place, and form a preservative capture space preventing preservative from escaping into a higher section of the sealable container.

Packaging tape (a type of "filament") is wrapped around the outside of the sealable container to cause a broad constriction near the top of the stems but below many of the leaves on the stems. The construction is formed about ¾ the way up the length of the stems and encloses about 70% of the leaves in the stem compartment thus formed. The walls of the sealable container in the stem section include six 2 mm diameter holes (perforations) that allow some gas exchange between the stem compartment and the outside air, but significantly reduce transpiration from leaves enclosed therein.

The opening at top of the sealable container can be left open. The blossom section of the sealable container (above the constriction) has from about 10 to about 100 two-millimeter perforations to improve gas exchange and to minimize wet contact between the section wall and flower buds. The constriction, on the stems well below the blossoms, bends the stems somewhat and caused the array of blossoms to fan out in a semi-hemispherical pattern and spaces the buds apart (this can help moisture escape from around the buds to prevent growth of Botrytis).

The open blossom compartment thus formed allows readily exchange of gas while the gas exchange in the stem compartment is substantially less. This combination allows the buds to stay dry. The exposed upper leaves transpire and promote transport of water and preservative constituents to the top of the flower, thus nourishing the buds. Enclosure of the majority of leaves in the stem compartment, e.g., minimizes overall transpiration to reduce preservative liquid consumption and reduce accumulation of humidity in the external environment.

The packaged flowers are placed in a refrigerated compartment and held at about 1-2° C. for 12 days for roses, or 17 days for alstroemeria, lilies or tulips with no apparent change in their freshness. After the said period of 12 or 17 days, there is no significant change in color of the flowers or leaves, no drooping of the buds, no significant opening of the buds, no apparent botrytis, and no shedding of petals or leaves. The flowers can have ends re-cut and inserted into fresh preservative liquid for another week's storage without significant deterioration of flower quality.

The packaged flowers can be removed from the storage containers and retained at ambient habitation conditions to begin blooming in 1-3 days. Generally, all the blossoms will open widely and product nearly the aroma of fresh cut flowers.

Control flowers held for 12 or 17 days in the same conditions not only will have inferior performance but also will exhibit enhanced spoilage or Botrytis.

Preservation of Cut Roses in a Three Chambered Package

A bunch of cut roses in early bud are selected and the cut ends placed in preservative container of preservative media. The preservative container includes a pierceable membrane cover, through which the ends are inserted into the preservative. The preservative media contains an agar (e.g., phytagar at 6 g/L), an auxin (e.g., indole-3-acetic acid at 5-10 mg/L, a cytokinin (e.g., BAP at 5-10 mg/L), copper sulfate at 100-300 mg/L, citric acid at 1-3 g/L, baking soda at 1-3 g/L and MS salts & vitamins (or KM salts or vitamins).

The preservative container and flowers are placed into a conical plastic bag sealable container so that the preservative container is securely received into the bottom section. Filaments are tied around the sealable container just above the level of the preservative container top to retain the preservative container in place, and form a preservative capture space preventing preservative from escaping into higher compartments of the sealable container.

Filaments are tied around the outside of the sealable container just below the level of the flower blossoms. The filaments are constricted enough to functionally define and separate the compartments but not so much as to significantly traumatize the flower buds. The walls of the sealable container in the stem section include about six 2 mm diameter holes (perforations) that allow gas exchange between the stem compartment and the outside air. Optionally, constrictions can be formed by twisting the walls of the sealable container.

The sealable opening at top of the sealable container is sealed by twisting gathered material and holding with tape. The blossom compartment thus formed exchanges gas only indirectly and slowly, e.g., past the constriction at the top of the stem compartment and through the perforations. The bloom section has 10-100 two-millimeter perforations. In another embodiment the blossom section was completely open which allow this compartment to have an ideal atmosphere/environment that prevents germination of fungal spores, and enhances transpiration.

The packaged flowers are placed in a shipping container comprising a conical-shaped plastic bag and the top sealed with a filament, as described above. Thus enclosed, the flowers can be held at 5° C. for 7 days with no apparent change in their freshness. The packaged flowers can be removed from the storage containers and retained at 5° C. for another 7 days, over which time the rose buds began to open slightly. Significant blossom browning or abscission are not observed.

Control flowers had inferior performance i.e. flowers bloomed and exhibited more fungal infestation.

A sealable container was prepared by heat sealing and cutting a tapered pattern from two layers of 4 mil low density polyethylene film. The 34 inch long tapered container is 6 inches across at the bottom and 18 inches across at the top, as measured with the container laid out flat.

A preservative media was prepared melting an agar (phytagar at 6 g/L) in water and supplementing that with an auxin (indole-3-acetic acid at 5-10 mg/L, a cytokinin (BAP at 5-10 mg/L), copper sulfate at 100-300 mg/L, citric acid at 1-3 g/L, baking soda at 1-3 g/L and MS salts & vitamins (or KM salts or vitamins) and 1.25 mg/L gibberellin. While the preservative is still warm, 250 milliliters is poured into the bottom of the packaging container (preservative container section).

The stems of a dozen roses are cut at a diagonal and immediately inserted into the preservative in the flexible container. A rubber band is positioned around the stems and the flexible container section while preservative is squeezed to force air out. The rubber band is allowed to constrict around the flexible container section and stems at, or below, the top of the preservative surface. A second rubber band is positioned one inch above the first rubber band and allowed to constrict around the top of the flexible container section and the stems, thus forming a sealing space between the flexible container section and the sealable container section.

The cut roses are ready for arrangement in racks and/or boxes for international shipment, wholesale handling or retail display. The roses in vases will retain a fresh appearance for 11 to 18 days at room temperature in addition to 10-12 days in product at 1-2 deg C. Holes can be perforated into the stem section, e.g., on arrival to a retailer to help maintain dryness in the stem compartment.

After use, preservative of the invention can often be, e.g., disposed of without harm to the environment. Thickeners, salts, vitamins and hormones of the preservative are, e.g., generally biodegradable. Preservative of the invention can, e.g., be disposed of in sewer systems or composted.

Preservation of Strawberry Plants

A plant preservation system for strawberry plants includes a preservative media in a flexible container section redundantly sealed from a sealable container section. The preservation system of the invention can, e.g., reduce the metabolism of the plant while inhibiting the growth of microbes that can damage the plant.

A packaging container is prepared by heat sealing and cutting a tapered pattern from two layers of 4 mil low density polyethylene film. The 34 inch long tapered container is 6 inches across at the bottom and 18 inches across at the top, as measured with the container laid out flat.

The plant is prepared by digging out the plant with an intact root ball, from the original growing site. The entrapped dirt is removed from the root ball by rinsing with water to leave the uprooted whole plant with exposed roots.

A preservative substrate is prepared by mixing 250 grams of sandy soil with 75 ml of water and 5 grams of ground neem leaves. Copper sulfate or 8-HQC is added to 200-250 parts per million. The soil can be previously sterilized, or not.

The plant is packaged into the container by placing the roots into the bottom flexible container section, followed by the preservative media. The plant is held raised somewhat off the bottom of the preservative container so preservative can flow into spaces between the roots. The top of the flexible container section is constricted around the plant stem at the top of the roots and held in place with an elastic band. Second band is placed 1 inch above the first band to form a sealing space.

The packaged plants can be arranged in racks and/or boxes for international shipment, wholesale handling or retail display. The strawberries will remain viable for up to about 3 months before replanting.

After use, the soil and preservative of the invention can be disposed of without harm to the environment. All the ingredients of the preservative can be biodegradable. Preservative liquid can typically be composted or disposed of at a waste management facility.

Dispensing Preservative Liquid

Dispensing of preservative liquid into the preservative containers of the invention can be practiced, e.g., by adaptation of processes and apparatus commercially available and known in the art. For example, technologies common in food processing, canning, coffee vending machines, wax-melting and dispensing machines, and/or the like, can be employed to scale up and/or enhance the efficiency of preservative dispensing in the invention.

In one example of a preservative liquid preparation and dispensing device, a container is provided with a preservative media concentrate inlet, a water inlet, and a preservative media dispensing outlet. The preservative concentrate inlet has a hopper and valve to meter a desired amount of preservative concentrate into the container. The water inlet has a volume metering device to add a selected volume of water into the container. The volume of water added can also be monitored by observing the liquid level relative to volume gradations marked on the container walls. The water can be preheated before introduction to the container while the temperature of preservative media in the container is adjustable by a thermostatically controlled heating element associated with the container. The container has a blender impeller driven by a shaft from an electric motor through a sealed bushing in the bottom of the container. The dispensing outlet includes a valve to introduce an antimicrobial into the preservative liquid during dispensing (alternately, the antimicrobial can be added from a pre-aliquotted packet in the flexible container of preservative liquid), a sanitary shroud, and a volumetric dispenser device. In use, a desired amount of hot water (about 90° C.) is introduced into the container from the water inlet. An appropriate amount of dry powder preservative mix, including phytagar, kinetin, IAA, and GA3, is added from the concentrate inlet while the mixture is blended by the impeller. The thermostat holds the mixture at 90° C. for several minutes until the mixture is homogenous and the phytagar is expanded to a gel. The thermostat is reset to about 45° C. and the preservative is allowed to cool. Once the preservative media has cooled, it can be dispensed through the dispensing outlet, along with an appropriate amount of a desired antimicrobial, into the flexible container of a plant preservation system.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A flower preservation device comprising:
   a monolithic sealable container comprising a stem section and a blossom section;
   one or more flowers comprising stems and blossoms; the one or more flowers packaged within the sealable container with the blossoms substantially in the blossom section and a majority of a lengthwise extension of the stems in the stem section; and
   a constriction in the sealable container between the stem section and blossom section defining the stem section and the blossom section.

2. The device of claim 1, wherein from 2 to about 50 flowers are packaged within the sealable container.

3. The device of claim 1, wherein the sealable container has a substantially conical shape.

4. The device of claim 1, wherein a gas exchange rate is lower in the stem section than in the blossom section or a relative humidity is higher in the stem compartment than in the blossom compartment.

5. The device of claim 1, further comprising supplemental levels of carbon dioxide in the blossom section.

6. The device of claim 1, wherein at least 80% of the flower stems are within the stem section.

7. The device of claim 1, wherein the device further comprises a preservative container containing a preservative liquid.

8. The device of claim 7, wherein an opening of the preservative container is sealed around the flower stems.

9. The device of claim 7, wherein the preservative liquid is a substantially sugar free preservative media.

10. The device of claim 1, further comprising an outer shipping container containing the sealable container of flowers.

11. The device of claim 10, wherein the shipping container is hermetically sealed around the sealable container of flowers.

12. The device of claim 10, wherein the shipping container comprises a plastic film.

13. The device of claim 1, wherein the constriction is formed by wrapping a filament around the outside of the sealable container at a level between the stem section and the blossom section.

14. A flower preservation device comprising:
    a monolithic sealable container comprising a preservative container section, a stem section and a blossom section;
    one or more flowers comprising roots or cut stem ends, stems and blossoms; the one or more flowers packaged within the sealable container with the roots or cut stem ends substantially within the preservative container section, a majority of a lengthwise extension of the stems within the stem section and one or more of the blossoms within the blossom section; and,
    a constriction in the sealable container between the stem section and blossom section defining a stem compartment and a blossom compartment;
    wherein an opening between the preservative container section and the stem section is sealed around the flower stems.

* * * * *